(12) United States Patent
Tamura et al.

(10) Patent No.: US 10,196,748 B2
(45) Date of Patent: Feb. 5, 2019

(54) REDUCTION CATALYST AND CHEMICAL REACTOR

(71) Applicant: KABUSHIKI KAISHA TOSHIBA, Tokyo (JP)

(72) Inventors: Jun Tamura, Yokohama (JP); Satoshi Mikoshiba, Yamato (JP); Akihiko Ono, Tokyo (JP); Chingchun Huang, Tokyo (JP); Yuki Kudo, Yokohama (JP); Ryota Kitagawa, Tokyo (JP); Eishi Tsutsumi, Kawasaki (JP); Yoshitsune Sugano, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 427 days.

(21) Appl. No.: 14/953,182

(22) Filed: Nov. 27, 2015

(65) Prior Publication Data

US 2016/0076158 A1 Mar. 17, 2016

Related U.S. Application Data

(63) Continuation of application No. PCT/JP2014/064334, filed on May 29, 2014.

(30) Foreign Application Priority Data

May 29, 2013 (JP) .................................. 2013-113438
Dec. 13, 2013 (JP) .................................. 2013-258218
May 29, 2014 (JP) .................................. 2014-110998

(51) Int. Cl.
*C25B 1/00* (2006.01)
*C25B 3/04* (2006.01)
(Continued)

(52) U.S. Cl.
CPC .......... *C25B 11/0489* (2013.01); *C25B 1/003* (2013.01); *C25B 3/04* (2013.01);
(Continued)

(58) Field of Classification Search
CPC .. C25B 1/003; C25B 3/04; C25B 9/08; C25B 11/0489; H01G 9/20; B01J 31/0239; B01J 31/0244
See application file for complete search history.

(56) References Cited

U.S. PATENT DOCUMENTS

| 5,284,563 A | 2/1994 | Fujihira et al. |
| 5,382,332 A | 1/1995 | Fujihira et al. |

(Continued)

FOREIGN PATENT DOCUMENTS

| EP | 0 101 422 A2 | 2/1984 |
| JP | 59-29376 A | 2/1984 |

(Continued)

OTHER PUBLICATIONS

Extended European Search Report dated Oct. 24, 2016 in Patent Application No. 14803965.4.

(Continued)

*Primary Examiner* — Ciel P Thomas
(74) *Attorney, Agent, or Firm* — Oblon, McClelland, Maier & Neustadt, L.L.P.

(57) ABSTRACT

According to one embodiment, a reduction catalyst includes a charge collector having a metal layer on a surface; and a modified organic molecule bound to a surface of the metal layer and containing a quaternary nitrogen cation.

20 Claims, 16 Drawing Sheets

(51) Int. Cl.
*C25B 9/08* (2006.01)
*C25B 11/04* (2006.01)
*H01G 9/20* (2006.01)
*B01J 31/02* (2006.01)

(52) U.S. Cl.
CPC .............. *C25B 9/08* (2013.01); *H01G 9/20* (2013.01); *B01J 31/0239* (2013.01); *B01J 31/0244* (2013.01)

(56) References Cited

U.S. PATENT DOCUMENTS

| | | | |
|---|---|---|---|
| 5,620,584 | A | 4/1997 | Reetz et al. |
| 5,879,828 | A * | 3/1999 | Debe .................. B82Y 15/00 429/483 |
| 5,925,463 | A | 7/1999 | Reetz et al. |
| 6,198,037 | B1 | 3/2001 | Nakata |
| 2005/0014060 | A1 | 1/2005 | Suzuki |
| 2005/0238948 | A1 | 10/2005 | Mei et al. |
| 2010/0133110 | A1* | 6/2010 | Nocera .................. C25B 1/003 205/340 |
| 2011/0114503 | A1* | 5/2011 | Sivasankar .............. C25B 3/00 205/436 |
| 2011/0237830 | A1 | 9/2011 | Masel |
| 2012/0111737 | A1 | 5/2012 | Figgemeier et al. |
| 2012/0171583 | A1* | 7/2012 | Bocarsly ............ H01M 4/8657 429/413 |
| 2012/0292199 | A1 | 11/2012 | Deguchi et al. |
| 2012/0308903 | A1 | 12/2012 | Masel |
| 2013/0023404 | A1 | 1/2013 | Masel et al. |
| 2013/0157174 | A1 | 6/2013 | Masel et al. |
| 2014/0131197 | A1 | 5/2014 | Suzuka et al. |

FOREIGN PATENT DOCUMENTS

| | | |
|---|---|---|
| JP | 59-112938 | 6/1984 |
| JP | 63-244565 A | 10/1988 |
| JP | 4-63115 | 2/1992 |
| JP | 4-63115 A | 2/1992 |
| JP | 7-310107 | 11/1995 |
| JP | 10-290017 A | 10/1998 |
| JP | 2000-144466 A | 5/2000 |
| JP | 2002-179420 | 6/2002 |
| JP | 2003-288955 A | 10/2003 |
| JP | 2009-190981 A | 8/2009 |
| JP | 2010-184195 | 8/2010 |
| JP | 2011-94194 | 5/2011 |
| JP | 2011-94194 A | 5/2011 |
| JP | 2013-114901 A | 6/2013 |
| KR | 10-2001-0005549 A | 1/2001 |
| KR | 10-2006-0045828 A | 5/2006 |
| WO | WO 2004/040679 A1 | 5/2004 |
| WO | WO 2011/120021 A1 | 9/2011 |
| WO | WO 2011/132375 | 10/2011 |
| WO | WO 2012/006240 | 1/2012 |
| WO | WO 2012/164913 A1 | 12/2012 |
| WO | WO 2013/150116 A1 | 10/2013 |

OTHER PUBLICATIONS

Bhupendra Kumar, et al., "Photochemical and Photoelectrochemical Reduction of $CO_2$," Annual Review of Physical Chemistry, vol. 63, No. 1, XP055114538, May 5, 2012, pp. 541-569 and cover pages.

Shoichiro Ikeda et al., "Properties of metal coated p-GaP photocathodes in photoelectrochemical reduction of carbon dioxide in aqueous electrolytes", Journal of the Chemical Society of Japan, (Oct. 8, 1988), No. 8, pp. 1141 to 1145.

Atsumu Imasato et al., "Suiyoeki-chu ni Okeru Do Denkyoku o Mochiita $CO_2$ Denkai Kangen ni Oyobosu Yonkyu Ammonium En Tenka no Eikyo", CSJ: The Chemical Society of Japan Dai 60 Shuki Nenkai (Gan Rengo Toronkai) Kagaku Kankeigaku Kyokai Rengo Kyogikai Kenkyu Happyokai Godo Taikai Koen Yokoshu II, (Dec. 9, 1990), p. 665.

International Search Report dated Jul. 15, 2014, in PCT/JP2014/064334 filed May 29, 2014.

Steven Y. Reece, et al., "Wireless Solar Water Splitting Using Silicon-Based Semiconductors and Earth-Abundant Catalysts" Science, vol. 334, Nov. 4, 2011, pp. 645-648.

Yoshio Hori, et al., "Electrocatalytic Process of CO Selectivity in Electrochemical Reduction of $CO_2$ at Metal Electrodes in Aqueous Media" Electrochimica Acta, vol. 39, No. 11/12, 1994, pp. 1833-1839.

Yu Sun, et al., "Photoelectrochemical Reduction of Carbon Dioxide at Si(111) Electrode Modified by Viologen Molecular Layer with Metal Complex" Chem. Lett. 2012, vol. 41, Feb. 29, 2012, pp. 328-330.

Combined Chinese Office Action and Search Report dated Dec. 19, 2016 in Chinese Patent Application No. 201480030479.1 (with English translation of categories of cited documents).

Office Action dated Jul. 4, 2017 in Japanese Patent Application No. 2014-110998.

Office Action dated Jun. 3, 2016 in Australian Patent Application No. 2014271702.

Korean Office Action dated Nov. 15, 2016 in patent application No. 10-2015-7033328.

* cited by examiner

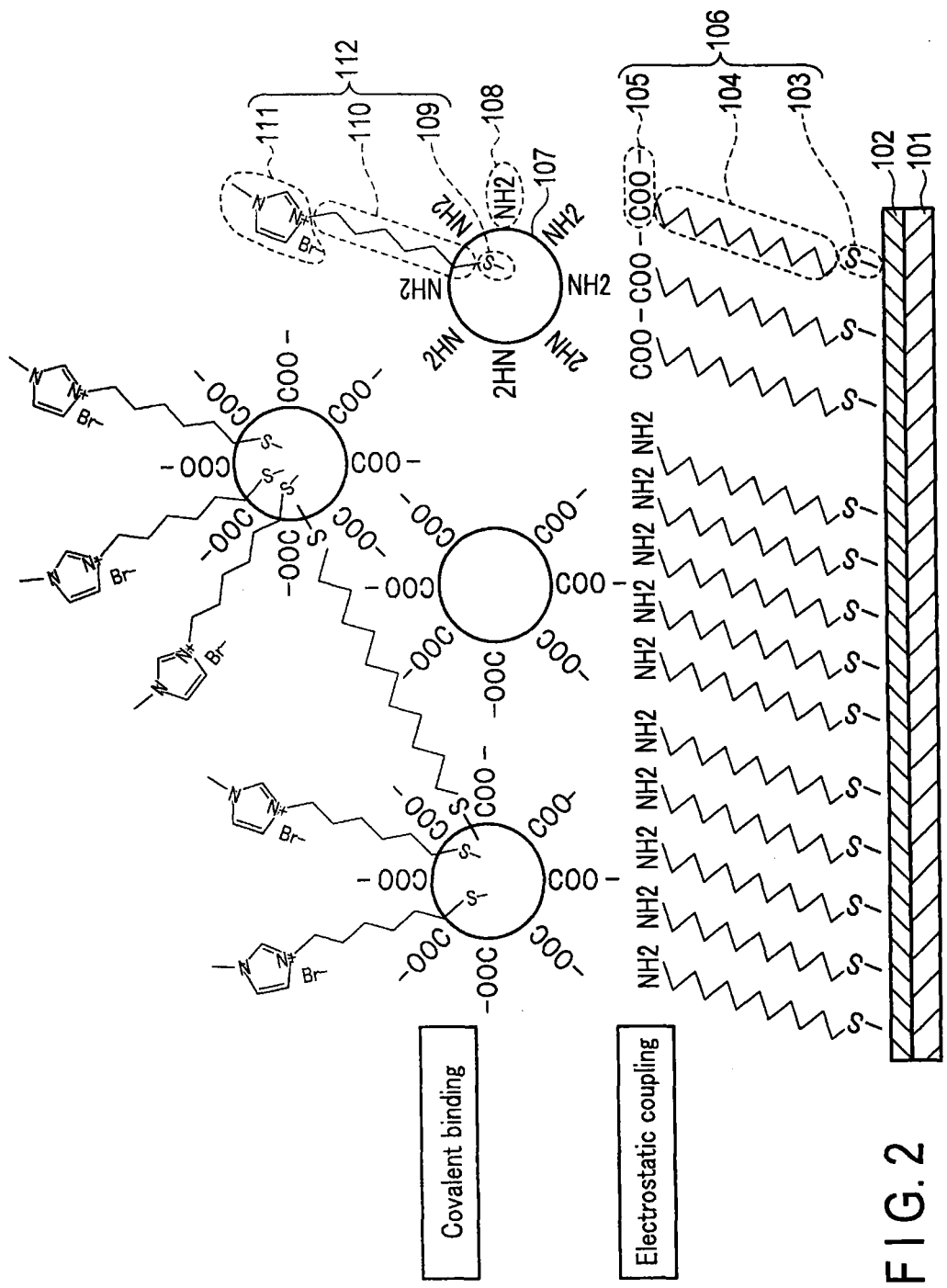
F I G. 2

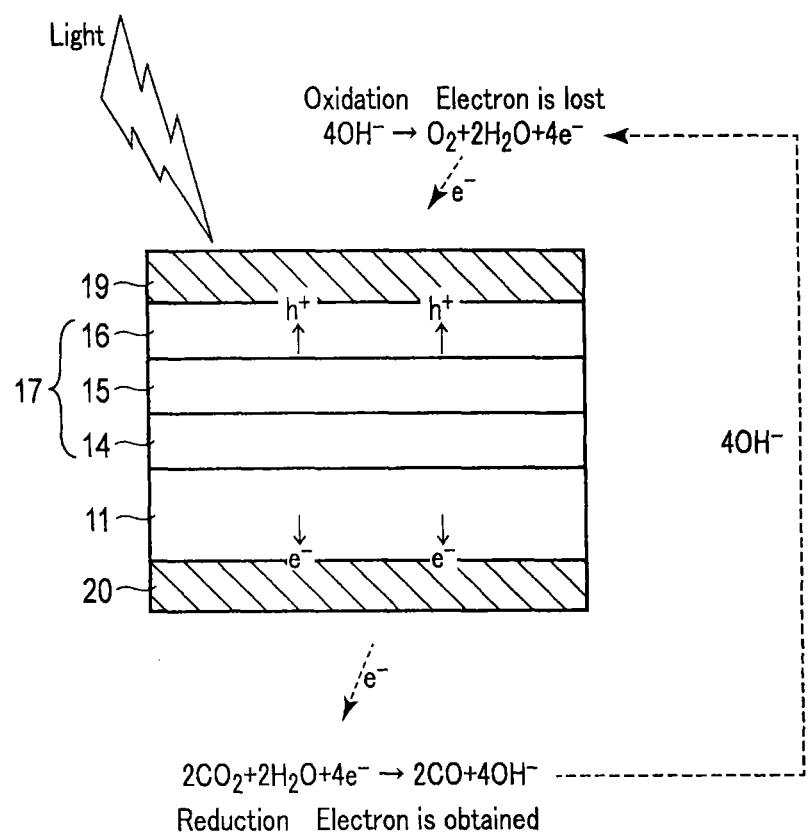
F I G. 7

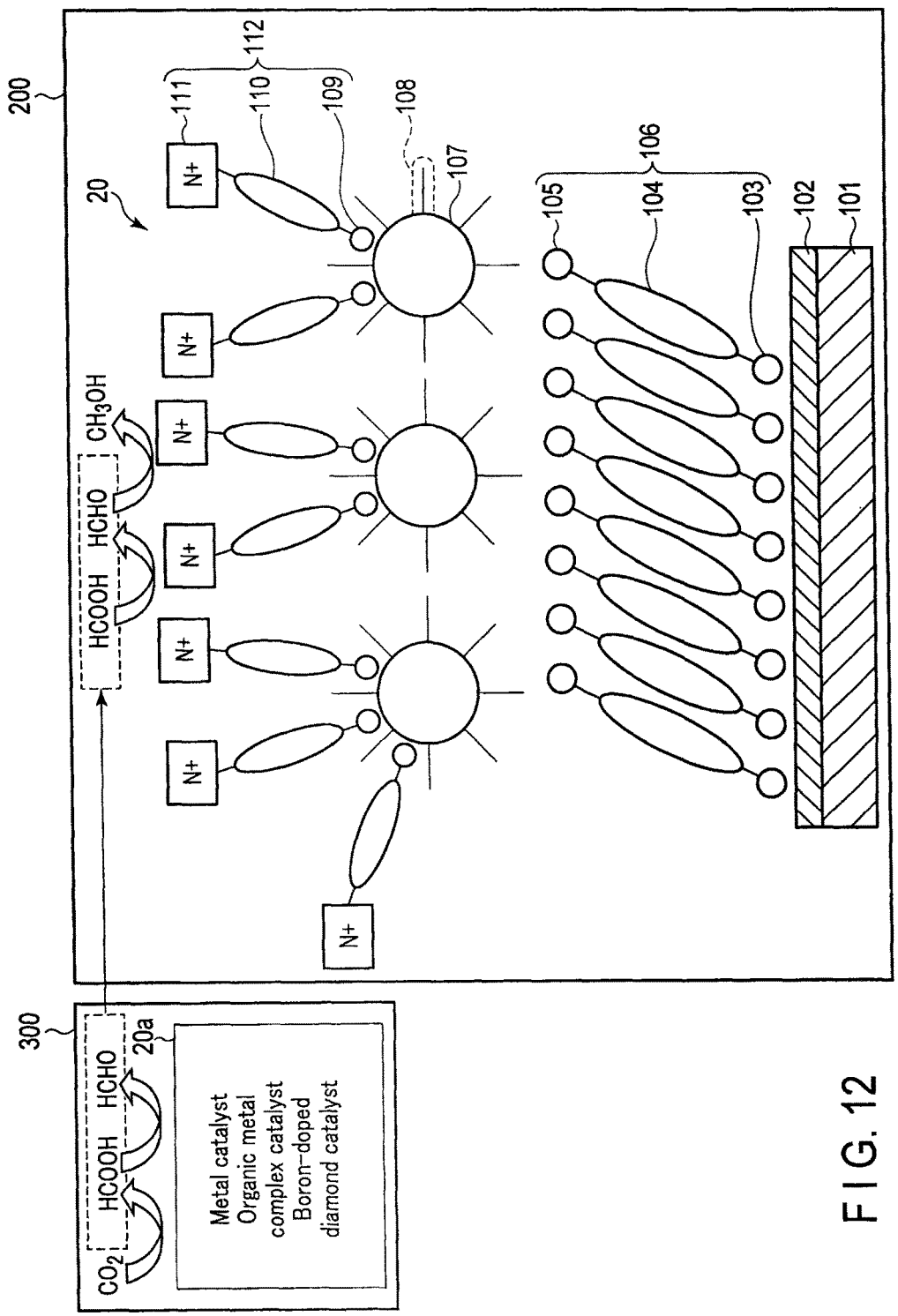
F I G. 12

| | Base material surface | Organic molecular layer | Au catalyst average particle diameter (nm) | Modified organic molecule | Voltage (V) @1mA/cm2 | CO selectivity (%) |
|---|---|---|---|---|---|---|
| Example 1 | Au | 10-carboxy-1-decanethiol | 20 | 11-mercaptoundecane-1-trimethylammoniumchloride | -1.19 | 78 |
| Example 2 | Au | 11-amino-1-undecanethiol | 20 | 1-(6-mercaptohexyl)-3-methylimidazolium bromide | -1.00 | 93 |
| Example 3 | Au | 1,6-hexane dithiol | 20 | 1-(8-mercaptooctyl)-4-methylpyridinium bromide | -1.06 | 85 |
| Example 4 | Au | 1-(6-mercaptohexyl)-4-methylpyridinium bromide | 20 | 1-(8-mercaptooctyl)-1-methylpiperidinium bromide | -1.09 | 83 |
| Example 5 | Au | 1-(12-mercaptododecyl)-3-methylimidazolium bromide | 20 | 1-(10-mercaptodecyl)-1-methylpyrrolidinium bromide | -1.11 | 82 |
| Example 6 | Au | 1-(6-mercaptohexyl)-4-methylpyridinium bromide | 20 | — | -1.15 | 87 |
| Example 7 | Au | 1-(6-mercaptohexyl)-4-methylpyridinium bromide | — | 1-(6-mercaptohexyl)-4-methylpyridinium bromide | -1.26 | 50 |
| Example 8 | Au | — | — | 1-(6-mercaptohexyl)-4-methylpyridinium bromide | -1.20 | 63 |
| Example 9 | TiO2 | 11-mercaptoundecane-1-phosphonic acid | 20 | 1-(8-mercaptooctyl)-3-methylimidazolium bromide | -1.02 | 91 |
| Example 10 | ZrO2 | 11-mercaptoundecane-1-phosphonic acid | 20 | 1-(8-mercaptooctyl)-3-methylimidazolium bromide | -1.02 | 91 |
| Example 11 | Al2O3 | 11-mercaptoundecane-1-phosphonic acid | 20 | 1-(8-mercaptooctyl)-3-methylimidazolium bromide | -1.02 | 91 |
| Comparative Example 1 | Au | — | — | — | -1.32 | 41 |

FIG. 13

| | Base material surface | Organic molecular layer | Au catalyst average particle diameter (nm) | Modified organic molecule | Voltage (V) @1mA/cm² | CO selectivity (%) |
|---|---|---|---|---|---|---|
| Example 12 | Au | 1-(4-mercaptobutyl)-3-methylimidazolium bromide | 0.5 | 1-(4-mercaptobutyl)-3-methylimidazolium bromide | -0.98 | 96 |
| Example 13 | Au | 1-(4-mercaptobutyl)-3-methylimidazolium bromide | 54 | 1-(4-mercaptobutyl)-3-methylimidazolium bromide | -1.05 | 95 |
| Example 14 | Au | 1-(4-mercaptobutyl)-3-methylimidazolium bromide | 105 | 1-(4-mercaptobutyl)-3-methylimidazolium bromide | -1.11 | 95 |
| Example 15 | Au | 1-(4-mercaptobutyl)-3-methylimidazolium bromide | 156 | 1-(4-mercaptobutyl)-3-methylimidazolium bromide | -1.15 | 95 |
| Example 16 | Au | 1-(4-mercaptobutyl)-3-methylimidazolium bromide | 300 | 1-(4-mercaptobutyl)-3-methylimidazolium bromide | -1.19 | 91 |
| Example 17 | Au | 1-(4-mercaptobutyl)-3-methylimidazolium bromide | 500 | 1-(4-mercaptobutyl)-3-methylimidazolium bromide | -1.29 | 84 |

F I G. 14

F I G. 15

| | Base material surface | Organic molecular layer | Metal catalyst average particle diameter (nm) | Modified organic molecule | Voltage (V) @1mA/cm² | CO selectivity (%) |
|---|---|---|---|---|---|---|
| Example 18 | Au | 1,10-decane dithiol | Ag 15 | 1-(6-mercaptohexyl)-4-methylpyridinium bromide | -1.22 | 88 |
| Example 19 | Ag | 1,10-decane dithiol | Pt 15 | 1-(6-mercaptohexyl)-4-methylpyridinium bromide | -1.10 | 25 |
| Example 20 | Ag | 1,10-decane dithiol | Ag 15 | 1-(6-mercaptohexyl)-4-methylpyridinium bromide | -1.21 | 87 |
| Example 21 | Cu | 1,10-decane dithiol | Cu 15 | 1-(6-mercaptohexyl)-4-methylpyridinium bromide | -1.31 | 40 |
| Example 22 | Zn | 1,10-decane dithiol | Zn 15 | 1-(6-mercaptohexyl)-4-methylpyridinium bromide | -1.44 | 50 |
| Example 23 | Pt | 1,10-decane dithiol | Sn 15 | 1-(6-mercaptohexyl)-4-methylpyridinium bromide | -1.47 | 41 |
| Example 24 | Au | 1,10-decane dithiol | Pd | 1-(6-mercaptohexyl)-4-methylpyridinium bromide | -1.28 | 43 |
| Example 25 | Fe | 1,10-decane dithiol | Au 15 | 1-(6-mercaptohexyl)-4-methylpyridinium bromide | -1.11 | 90 |
| Example 26 | Ti | 1,10-decane dithiol | Au 15 | 1-(6-mercaptohexyl)-4-methylpyridinium bromide | -1.20 | 89 |
| Example 27 | Ni | 1,10-decane dithiol | Au 15 | 1-(6-mercaptohexyl)-4-methylpyridinium bromide | -1.21 | 88 |
| Example 28 | Sn | 1,10-decane dithiol | Au 15 | 1-(6-mercaptohexyl)-4-methylpyridinium bromide | -1.24 | 89 |
| Example 29 | In | 1,10-decane dithiol | Au 15 | 1-(6-mercaptohexyl)-4-methylpyridinium bromide | -1.20 | 87 |
| Example 30 | Bi | 1,10-decane dithiol | Au 15 | 1-(6-mercaptohexyl)-4-methylpyridinium bromide | -1.18 | 85 |
| Comparative Example 1 | Au | — | — | — | -1.32 | 41 |
| Comparative Example 2 | Pt | — | — | — | -1.20 | 0.1 |
| Comparative Example 3 | Ag | — | — | — | -1.42 | 36 |
| Comparative Example 4 | Cu | — | — | — | -1.50 | 3 |
| Comparative Example 5 | Zn | — | — | — | -1.63 | 29 |
| Comparative Example 6 | Pd | — | — | — | -1.50 | 10 |
| Comparative Example 7 | Fe | — | — | — | -1.35 | 0.2 |
| Comparative Example 8 | Ti | — | — | — | -1.82 | 0.3 |
| Comparative Example 9 | Ni | — | — | — | -1.72 | 1.1 |
| Comparative Example 10 | Sn | — | — | — | -1.70 | 2.3 |
| Comparative Example 11 | In | — | — | — | -1.78 | 1.6 |
| Comparative Example 12 | Bi | — | — | — | -1.65 | 2.0 |

| | Base material surface | Organic molecular layer | Au catalyst average particle diameter (nm) | Modified organic molecule | Electrolytic solution | Voltage (V) @1mA/cm2 | CO selectivity (%) |
|---|---|---|---|---|---|---|---|
| Example 31 | Au | 1-(4-mercaptobutyl)-1-methylpyrrolidinium bromide | 30 | 1-(4-mercaptobutyl)-1-methylpyrrolidinium bromide | 50% triethanolamine aqueous solution | -1.16 | 90 |
| Example 32 | Au | 1-(4-mercaptobutyl)-1-methylpyrrolidinium bromide | 30 | 1-(4-mercaptobutyl)-1-methylpyrrolidinium bromide | 90% EMIBF$_4$ aqueous solution | -1.00 | 95 |
| Example 33 | Au | 1-(4-mercaptobutyl)-1-methylpyrrolidinium bromide | 30 | 1-(4-mercaptobutyl)-1-methylpyrrolidinium bromide | 50% NaHCO$_3$ aqueous solution | -1.23 | 88 |
| Comparative Example 1 | Au | — | — | — | 50% triethanolamine aqueous solution | -1.32 | 41 |
| Comparative Example 13 | Au | — | — | — | 90% EMIBF$_4$ aqueous solution | -1.21 | 55 |
| Comparative Example 14 | Au | — | — | — | 5% NaHCO$_3$ aqueous solution | -1.42 | 40 |

F I G. 16

| | Base material surface | Organic molecular layer | Au catalyst average particle diameter (nm) | Modified organic molecule | Voltage (V) @1mA/cm² | Selectivity (%) | | | |
|---|---|---|---|---|---|---|---|---|---|
| | | | | | | CO | HCOOH | HCHO | CH₃OH |
| Example 34 | Au | 1-(2-mercaptoethyl)-3-methylimidazolium bromide | 3 | 1-(2-mercaptoethyl)-3-methylimidazolium bromide | -0.85 | 30 | 2 | 20 | 30 |
| Example 35 | Au | 1-(6-mercaptohexyl)-3-methylimidazolium bromide | 3 | 1-(6-mercaptohexyl)-3-methylimidazolium bromide | -0.92 | 27 | 2 | 18 | 25 |
| Example 36 | Au | 1-(12-mercaptododecyl)-3-methylimidazolium bromide | 3 | 1-(12-mercaptododecyl)-3-methylimidazolium bromide | -1.13 | 23 | 1 | 15 | 21 |
| Example 37 | Au | 1-(2-mercaptoethyl)-4-methylpyridinium bromide | 3 | 1-(2-mercaptoethyl)-4-methylpyridinium bromide | -0.90 | 40 | 2 | 25 | 10 |
| Example 38 | Au | 1-(2-mercaptoethyl)-1-methylpyrrolidinium bromide | 3 | 1-(2-mercaptoethyl)-1-methylpyrrolidinium bromide | -0.95 | 33 | 30 | 2 | 20 |
| Example 39 | Au | 1-(2-mercaptoethyl)-1-methylpiperidinium bromide | 3 | 1-(2-mercaptoethyl)-1-methylpiperidinium bromide | -0.98 | 45 | 25 | 10 | 10 |
| Comparative Example 14 | Au | — | — | — | -1.42 | 40 | — | — | — |

FIG. 17

| | Base material surface | Organic molecular layer | Metal catalyst average particle diameter (nm) | Modified organic molecule | Electrolytic solution | Energy conversion efficiency (%) |
|---|---|---|---|---|---|---|
| Example 40 | Au | 1-(4-mercaptobutyl)-3-methylimidazolium bromide | Au 20 | 1-(4-mercaptobutyl)-3-methylimidazolium bromide | 50% triethanolamine aqueous solution | 0.03 |
| Comparative Example 15 | Au | — | — | — | 50% triethanolamine aqueous solution | 0.01 |

F I G. 18

| | Base material surface | Au catalyst average particle diameter (nm) | Organic molecular layer | Modified organic molecule | Modified molecular density (atom/cm²) | Electrolytic solution | Selectivity (%) | | | | | | | |
|---|---|---|---|---|---|---|---|---|---|---|---|---|---|---|
| | | | | | | | CO | HCOOH | HCHO | $CH_3OH$ | $CH_3COOH$ | $CH_3CHO$ | $CH_3CH_2OH$ | $CO_2$ reduction total |
| Example 41 | Au | 3 | 1-(2-mercaptoethyl)-3-methylimidazolium bromide | 1-(2-mercaptoethyl)-3-methylimidazolium bromide | 1×10¹¹ | 5% $NaHCO_3$ aqueous solution | 20 | 7 | 25 | 35 | <1 | <1 | <1 | 87 |
| Example 42 | Au | 3 | 1-(6-mercaptohexyl)-3-methylimidazolium bromide | 1-(6-mercaptohexyl)-3-methylimidazolium bromide | 1×10¹¹ | 5% $NaHCO_3$ aqueous solution | 19 | 7 | 23 | 31 | <1 | <1 | <1 | 80 |
| Example 43 | Au | 3 | 1-(12-mercaptododecyl)-3-methylimidazolium bromide | 1-(12-mercaptododecyl)-3-methylimidazolium bromide | 1×10¹¹ | 5% $NaHCO_3$ aqueous solution | 13 | 6 | 20 | 26 | <1 | <1 | <1 | 65 |
| Example 44 | Au | 3 | 1-(2-mercaptoethyl)-4-methylpyridinium bromide | 1-(2-mercaptoethyl)-4-methylpyridinium bromide | 1.2×10¹¹ | 5% $NaHCO_3$ aqueous solution | 30 | 7 | 30 | 15 | <1 | <1 | <1 | 82 |
| Example 45 | Au | 3 | 1-(2-mercaptoethyl)-1-methylpyrrolidinium bromide | 1-(2-mercaptoethyl)-1-methylpyrrolidinium bromide | 1×10¹¹ | 5% $NaHCO_3$ aqueous solution | 23 | 35 | 7 | 25 | <1 | <1 | <1 | 90 |
| Example 46 | Au | 3 | 1-(2-mercaptoethyl)-1-methylpiperidinium bromide | 1-(2-mercaptoethyl)-1-methylpiperidinium bromide | 1.3×10¹¹ | 5% $NaHCO_3$ aqueous solution | 35 | 30 | 15 | 15 | <1 | <1 | <1 | 95 |

| | Base material surface | Organic molecular layer | Au catalyst average particle diameter (nm) | Modified organic molecule | Modified molecular density (atom/cm²) | Electrolytic solution | Selectivity (%) | | | | | | | |
|---|---|---|---|---|---|---|---|---|---|---|---|---|---|---|
| | | | | | | | CO | HCOOH | HCHO | $CH_3OH$ | $CH_3COOH$ | $CH_3CHO$ | $CH_3CH_2OH$ | $CO_2$ reduction total |
| Example 47 | Au | 1-(2-mercaptoethyl)-3-methylimidazolium bromide | 3 | 1-(2-mercaptoethyl)-3-methylimidazolium bromide | 1×10¹⁴ | 5% NaHCO₃ aqueous solution | 2 | 1 | 1 | 1 | 60 | 15 | 5 | 85 |
| Example 48 | Au | 1-(6-mercaptohexyl)-3-methylimidazolium bromide | 3 | 1-(6-mercaptohexyl)-3-methylimidazolium bromide | 8×10¹³ | 5% NaHCO₃ aqueous solution | 2 | 2 | 3 | 5 | 55 | 10 | 3 | 80 |
| Example 49 | Au | 1-(12-mercaptododecyl)-3-methylimidazolium bromide | 3 | 1-(12-mercaptododecyl)-3-methylimidazolium bromide | 1.2×10¹⁵ | 5% NaHCO₃ aqueous solution | 2 | 1 | 1 | 1 | 63 | 15 | 5 | 88 |
| Example 50 | Au | 1-(2-mercaptoethyl)-4-methylpyridinium bromide | 3 | 1-(2-mercaptoethyl)-4-methylpyridinium bromide | 5×10¹² | 5% NaHCO₃ aqueous solution | 13 | 5 | 11 | 15 | 30 | 6 | 1 | 81 |
| Example 51 | Au | 1-(2-mercaptoethyl)-1-methylpyrrolidinium bromide | 3 | 1-(2-mercaptoethyl)-1-methylpyrrolidinium bromide | 1×10¹⁴ | 50% triethanolamine aqueous solution | 10 | 1 | 1 | 1 | 61 | 12 | 5 | 91 |
| Example 52 | Au | 1-(2-mercaptoethyl)-1-methylpiperidinium bromide | 3 | 1-(2-mercaptoethyl)-1-methylpiperidinium bromide | 1×10¹⁴ | 90% EMIBF₄ aqueous solution | 11 | 1 | 1 | 1 | 63 | 13 | 8 | 98 |
| Comparative Example 14 | Au | — | — | — | — | — | 40 | — | — | — | — | — | — | 40 |

REDUCTION CATALYST AND CHEMICAL REACTOR

CROSS-REFERENCE TO RELATED APPLICATIONS

This application is a Continuation application of PCT Application No. PCT/JP2014/064334, filed May 29, 2014 and based upon and claims the benefit of priority from the prior Japanese Patent Application No. 2013-113438, filed May 29, 2013, the prior Japanese Patent Application No. 2013-258218, filed Dec. 13, 2013, and the prior Japanese Patent Application No. 2014-110998, filed May 29, 2014, the entire contents of which are incorporated herein by reference.

FIELD

Embodiments of the present invention relate to a reduction catalyst and a chemical reactor.

BACKGROUND

From the viewpoint of energy problems and environmental problems, $CO_2$ is required to be efficiently reduced using light energy, such as in plants. Plants use a system called the Z-scheme which excites light energy in two stages. Due to a photochemical reaction in such a system, plants oxidize water ($H_2O$) to obtain electrons, and, thus, to reduce carbon dioxide ($CO_2$), thereby synthesizing cellulose and sugars.

However, the technologies for obtaining electrons from water, via dissolving $CO_2$ through an artificial photochemical reaction without using any sacrificial reagent, are of very low efficiency.

For example, Jpn. Pat. Appln. KOKAI Publication No. 2011-094194 as a photochemical reactor is provided with an electrode for an oxidation reaction for oxidizing $H_2O$ to produce oxygen ($O_2$) and an electrode for a reduction reaction for reducing $CO_2$ to produce a carbon compound. The electrode for oxidation reaction is provided with an oxidation catalyst for oxidizing $H_2O$ on a surface of a photocatalyst and gains a potential via the light energy. The electrode for reduction reaction is provided with a reduction catalyst for reducing $CO_2$ on a surface of the photocatalyst and is connected to the electrode for oxidation reaction with an electric wire. The electrode for reduction reaction gains a reduction potential of $CO_2$ from the electrode for oxidation reaction to reduce $CO_2$, and, thus, to produce formic acid (HCOOH). Thus, to gain the potential necessary for reducing $CO_2$ using an optical wavelength and a photocatalyst, the photochemical reaction device employs a Z-scheme-type artificial photosynthesis system that imitates plants.

However, in Jpn. Pat. Appln. KOKAI Publication No. 2011-094194, the solar energy conversion efficiency is very low at around 0.04%. This is because the energy efficiency of the photocatalyst excited by the optical wavelength is low. Since the electrode for reduction reaction is connected to the electrode for oxidation reaction with an electric wire, the efficiency in extracting electricity (electric current) decreases due to interconnection resistance, thus the efficiency becomes low.

S. Y. Reece, et al., Science. vol. 334. pp. 645 (2011) provides a configuration in which a silicon solar cell is used for achieving the reaction potential and catalysts are provided on both sides of the silicon solar cell to produce a reaction. The solar energy conversion efficiency is very high at around 2.5%. Since this device has a structure requiring no wiring, it can be easily increased in size. As examples of the features of the device, a cell itself serves as a divider plate to allow for isolation of a product, and, thus, to eliminate a process for separating the product.

However, for this device, there are no examples of success in the reduction reaction of $CO_2$. Such a plate-like laminated structure does not take into consideration the fact that, for the $CO_2$ reduction reaction, ions with a positive charge generated on the oxidation side and ions with a negative charge generated on the reduction side need to move to the opposite sides. In an oxidation-reduction reaction in which $H_2O$ is used as an electron donor instead of a sacrificial catalyst, in particular, proton (hydrogen ion ($H^+$)) movement or hydroxide ion ($OH^-$) movement is indispensable.

Y. Hori, et al., Electrochim. Acta. 1994, 39, 1833 reports $CO_2$ reduction activities in various metal electrodes. In a $CO_2$ reduction reaction, electrons and protons are reacted with $CO_2$ to produce a hydrocarbon such as carbon monoxide (CO), formic acid (HCOOH), methanol ($CH_3OH$), and methane ($CH_4$). Hydrocarbons produced by a reduction reaction differ depending on the number, of electrons obtained by the reduction reaction. For example, carbon monoxide and formic acid are produced by a reaction with two electrons, methanol is produced by a reaction with six electrons, and methane is produced by a reaction with eight electrons. In a reaction for producing any hydrocarbon, a standard oxidation-reduction potential is substantially equivalent to a reaction for reducing hydrogen ions to produce hydrogen. However, a large overvoltage (excess energy) is actually required for a reduction reaction of a first electron, and the reduction reaction hardly proceeds. In a reduction reaction with a larger number of electrons, it is more difficult to advance the reduction reaction with a Faraday efficiency. In order to carry out a $CO_2$ reduction reaction for producing a desired hydrocarbon with selectively high efficiency, a highly active electrode catalyst is required.

In Yu Sun, et al., Chem. Lett. 2012, 41, 328, a $CO_2$ reduction reaction is carried out in an electrode provided with an organic molecule for solidifying an Au catalyst on an Si substrate. More specifically, the Si substrate absorbs light to separate charges, and, thus, to produce an electron. The produced electron is then transferred to the Au catalyst through a molecule bound to the Si substrate, and the $CO_2$ reduction reaction is carried out on the Au catalyst.

As described above, a $CO_2$ reduction technique having high reaction efficiency is required.

BRIEF DESCRIPTION OF THE DRAWING

FIG. 2 is a view showing in detail an example of the configuration of the $CO_2$ reduction catalyst according to the embodiment;

FIG. 7 is a cross-sectional view showing another example of the operating principle of the photochemical reaction cell according to the embodiment;

FIG. 12 is a view showing a photochemical reactor and an electrolytic apparatus according to the embodiment;

FIG. 13 is a view showing Examples 1 to 11 of the $CO_2$ reduction catalyst according to the embodiment, Comparative Example 1, and evaluation of the $CO_2$ reduction performances of them;

FIG. 14 is a view showing Examples 12 to 17 of the $CO_2$ reduction catalyst according to the embodiment and evaluation of the $CO_2$ reduction performances of them;

FIG. 15 is a view showing Examples 18 to 30 of the $CO_2$ reduction catalyst according to the embodiment, Comparative Examples 1 to 12, and evaluation of the $CO_2$ reduction performances of them;

FIG. 16 is a view showing Examples 31 to 33 of the $CO_2$ reduction catalyst according to the embodiment, Comparative Examples 1, 13, and 14, and evaluation of the $CO_2$ reduction performances of them;

FIG. 17 is a view showing Examples 34 to 39 of the $CO_2$ reduction catalyst according to the embodiment, Comparative Example 14, and evaluation of the $CO_2$ reduction performances of them;

FIG. 18 is a view showing Example 40 of the $CO_2$ reduction catalyst according to the embodiment, Comparative Example 15, and evaluation of the $CO_2$ reduction performances of them;

FIG. 19 is a view showing Examples 41 to 46 of the $CO_2$ reduction catalyst according to the embodiment and evaluation of the $CO_2$ reduction performances of them; and FIG. 20 is a view showing Examples 47 to 52 of the $CO_2$ reduction catalyst according to the embodiment, Comparative Example 14, and evaluation of the $CO_2$ reduction performances of them.

DETAILED DESCRIPTION

Figure 1:
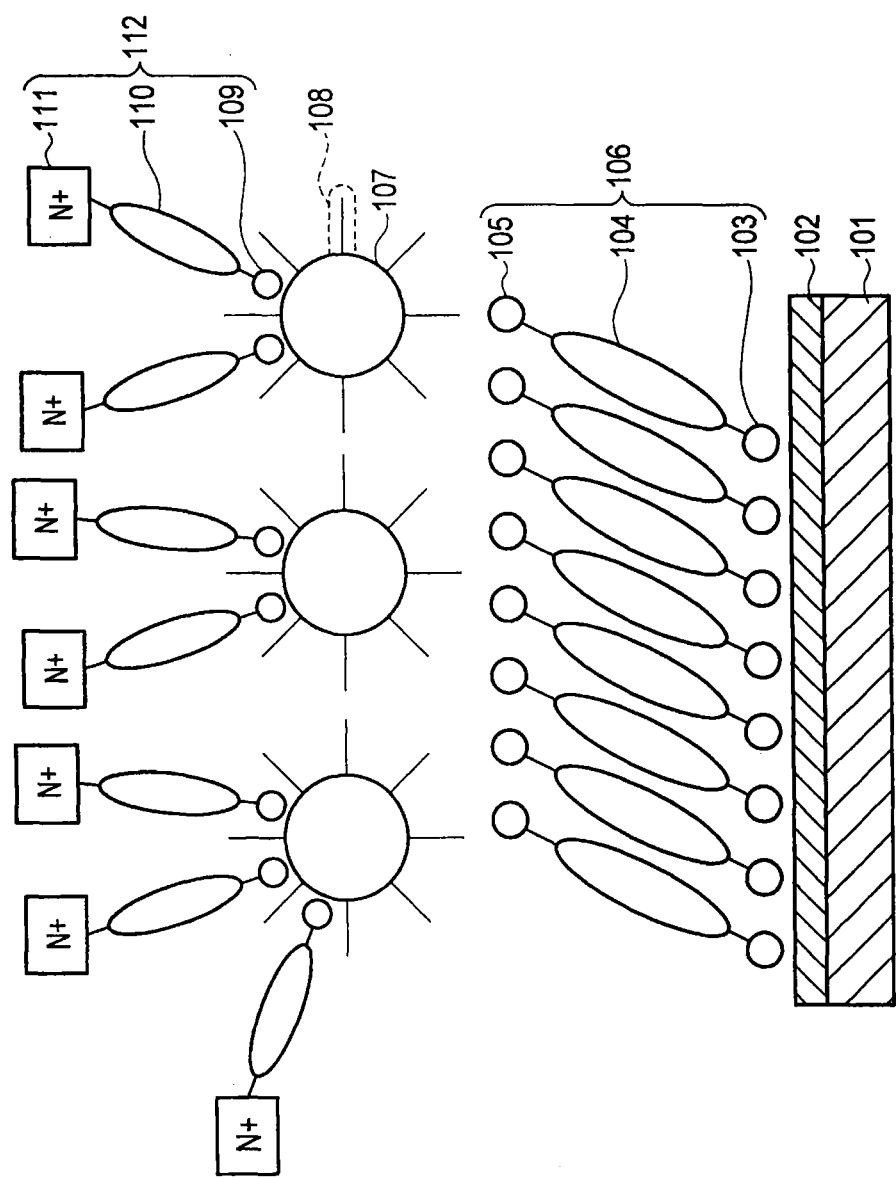
FIG. 1 is a view showing a configuration of a $CO_2$ reduction catalyst according to an embodiment.

In general, according to one embodiment, a reduction catalyst includes a charge collector having a metal layer on a surface; and a modified organic molecule bound to a surface of the metal layer and containing a quaternary nitrogen cation.

An embodiment will be hereinafter described with reference to the drawings. In the drawings, the same components as those in the drawings are assigned the same reference numerals. Overlapping descriptions will be made, if needed.

1. $CO_2$ Reduction Catalyst

A $CO_2$ reduction catalyst according to the present embodiment will be described using FIGS. 1 to 4. In this embodiment, metal fine particles 107 are fixed onto a surface (a surface layer 102) of a charge collector 101 through an organic molecular layer 106, and modified organic molecules 112 are formed on the metal fine particle 107. Then, reduction reaction of $CO_2$ is carried out in the metal fine particle 107. Consequently, the $CO_2$ reduction reaction with a high reaction efficiency can be achieved. Hereinafter, this embodiment will be described in detail.

[Configuration]

FIG. 1 is a view showing a configuration of the $CO_2$ reduction catalyst according to the present embodiment. FIG. 2 is a view showing in detail an example of the configuration of the $CO_2$ reduction catalyst according to this embodiment.

As shown in FIGS. 1 and 2, the $CO_2$ reduction catalyst according to this embodiment is a part of an electrode which reduces $CO_2$ electrochemically and is provided with a laminate constituted of the charge collector 101, the organic molecular layer 106, the metal fine particles 107, and the modified organic molecules 112. The metal fine particles 107 are connected to the charge collector 101 through the organic molecular layer 106, and the modified organic molecules 112 for promoting the $CO_2$ reduction reaction are bound to a surface of the metal fine particle 107.

Although the charge collector 101 is a stainless steel substrate, for example, the charge collector is not limited as long as it has electrical conductivity, and can be suitably selected taking cost, processability, and so on into consideration. The surface layer 102 constituted of a metal layer or an oxide layer is formed on a surface of the charge collector 101. If the surface layer 102 is constituted of a metal layer, the surface layer 102 is constituted of a metal layer containing at least one element selected from the group consisting of Au, Ag, Cu, Pt, Zn, Fe, Ti, Sn, In, Bi, and Ni. Meanwhile, if the surface layer 102 is constituted of an oxide layer, the surface layer 102 is constituted of an oxide layer containing titanium oxide ($TiO_2$), zirconium oxide ($ZrO_2$), aluminum oxide ($Al_2O_3$), silicon oxide ($SiO_2$), zinc oxide (ZnO), tin-doped indium oxide (ITO), fluorine-doped tin oxide (FTO), or the like. The surface layer 102 may be an oxide film layer of a stainless steel substrate surface. Further, a metal constituting the surface layer 102 may serve as the charge collector 101.

As a method of forming the surface layer 102 on the surface of the charge collector 101, existing vacuum film deposition methods such as a sputtering method, an evaporation method, and ALD (Atomic Layer Deposition) method may be used.

The oxide layer is usually an insulator, except for transparent conductive films such as ITO and FTO. In order to secure conduction operating on a tunnel current, a film thickness of the oxide layer is preferably not more than 10 nm and more preferably not more than 5 nm.

The organic molecular layer 106 is chemically bound to the surface (surface layer 102) of the charge collector 101. The organic molecular layer 106 is chemically adsorbed onto the surface of the charge collector 101 and is a single layer film formed by self-organization. The organic molecular layer 106 has a function of fixing and electrically connecting the metal fine particles 107 to the charge collector 101.

The organic molecular layer 106 has a long chain alkyl group 104 and reactive functional groups 103 and 105 bound to the respective terminals of the long chain alkyl group 104.

In the long chain alkyl group 104, as the alkyl chain length increases, a more dense and aligned molecular layer can be obtained with respect to the charge collector 101. Thus, if the alkyl chain length of the long chain alkyl group 104 is increased, the fixation of the metal fine particles 107 and the durability of the organic molecular layer 106 are enhanced. Meanwhile, if the alkyl chain length of the long chain alkyl group 104 is significantly increased, resistance of tunnel current in the organic molecular layer 106 increases, and the electrode resistance increases. Accordingly, the number of carbons in the alkyl chain length of the long chain alkyl group 104 is preferably 2 to 16.

The reactive functional group 103 is formed at one terminal of the long chain alkyl group 104. The reactive functional group 103 has an affinity for the charge collector 101 and chemically reacts with the charge collector 101 to be bound thereto. Thus, the organic molecular layer 106 is fixed onto the charge collector 101. If the surface (surface layer 102) of the charge collector 101 is formed of a metal layer, the reactive functional group 103 is preferably a functional group capable of being covalently bound, such as a thiol group, a disulfide group, and a thiocyanate group. Among them, a thiol group is more preferable because it has an excellent binding force. Meanwhile, if the surface layer 102 is constituted of an oxide layer or an oxide film layer of a stainless substrate surface, the reactive functional group 103 is preferably a functional group capable of being covalently bound, such as a carboxylic acid group, a phosphonic acid group, a phosphoric ester group, or an alkoxysilyl group. Among them, a phosphoric ester group is more preferable because it has an excellent binding force.

The reactive functional group 105 is formed at the other terminal of the long chain alkyl group 104. The reactive functional group 105 has an affinity for the metal fine particle 107 and chemically reacts with the metal fine particle 107 to be bound thereto. Thus, the reactive functional group 105 fixes the metal fine particle 107 onto the surface of the organic molecular layer 106. The reactive functional group 105 is preferably a functional group capable of being covalently bound, such as a thiol group, a disulfide group, and a thiocyanate group. Among them, a thiol group is more preferable because it has an excellent binding force.

The metal fine particles 107 are chemically bound to the surface (reactive functional group 105) of the organic molecular layer 106. The metal fine particle 107 is provided with an organic molecule (reactive functional group) 108 having an electrical charge at a part of its surface and thereby charged. The electrical charge on the surface of the metal fine particle 107 generates electrostatic repulsion between the particles and can prevent the nano-particle sized fine particles from being flocculated and coarse.

The metal fine particles 107 can be fixed onto the surface of the organic molecular layer 106 by electrostatic attraction (electrostatic coupling) using the electrical charge on the surface of the metal fine particle 107 and the electrical charge of the reactive functional group 105 in the organic molecular layer 106. More specifically, if the surface of the metal fine particle 107 has a negative electrical charge of a carboxyl group, the metal fine particle 107 can be fixed by selecting an amino group or a quaternary nitrogen cation as the reactive functional group 105 in the organic molecular layer 106. On the other hand, if the surface of the metal fine particle 107 has a positive electrical charge of an amino group or a quaternary nitrogen cation, the metal fine particle 107 can be fixed by selecting a carboxyl group as the reactive functional group 105.

As the electrical charge of the surface of the metal fine particle 107, the electrical charge operating on the organic molecule 108 resulting from a process for producing the metal fine particles 107 or the electrical charge operating on the organic molecule 108 resulting from a processing after production can be imparted. For example, if a reducing agent such as citric acid is used when the metal fine particle 107 is precipitated by reduction from a liquid layer, citric acid is given to the surface of the metal fine particle 107, and the surface of the metal fine particle 107 is negatively charged. Then, when a molecule having an amino group is electrostatically coupled to the surface of the negatively charged metal fine particle 107, the surface of the metal fine particle 107 is positively charged. Meanwhile, even if an amine molecule having a covalently binding reactive group such as thiol is reacted with the surface of the metal fine particle 107, the surface of the metal fine particle 107 is positively charged. Namely, the amine molecule having a covalently binding reactive group such as thiol can be used regardless of presence or absence of the charge of the surface of the metal fine particle 107 and the positive and negative of the charge.

The metal fine particle 107 is a catalyst for activating the $CO_2$ reduction reaction and is metal containing at least one element selected from the group consisting of Au, Ag, Cu, Pt, Zn, Fe, Ti, Sn, In, Bi, and Ni. As the metal fine particle 107, commercially available metals may be suitably selected, and among them, Au or Ag having high catalytic activity is preferably selected.

If the metal fine particle 107 is a nano-fine particle, it has high catalytic activity. Thus, an average particle diameter of the metal fine particles 107 is preferably not more than 300 nm, for example. This is because if the average particle diameter of the metal fine particles 107 is more than 300 nm, the activity efficiency of the metal fine particles 107 is significantly lowered.

The average particle diameter of the metal fine particles 107 is preferably not less than 1 nm and not more than 150 nm. The upper limit is determined considering the above-described activity. Meanwhile, the lower limit is determined considering a difficulty in a fine particle production process. Namely, if the average particle diameter of the metal fine particles 107 is less than 0.5 nm, it is difficult to control the fine particle production process, and the fine particle production cost becomes high.

As the metal fine particles 107, fine particles having an average particle diameter of not more than 50 nm may be used alone, or an aggregate of primary particles (secondary particles) comprising these fine particles may be used.

As a method of calculating the average particle diameter of the metal fine particles 107, the average particle diameter can be calculated by particle size distribution measurement using a dynamic light scattering method. The dynamic light scattering method is a method of applying a laser beam to a solution dispersed with the metal fine particles 107, detecting any fluctuation of scattered light reflecting a diffusion coefficient, and thereby measuring a particle diameter using the Stokes-Einstein equation. In a frequency distribution in which an appearance ratio for each particle diameter is obtained, the largest particle diameter or a local maximum value of distribution is a mode diameter, and this is used as the average particle diameter.

The modified organic molecule 112 is chemically bound to the surface of the metal fine particle 107. The modified organic molecule 112 has a reactive functional group 109, a long chain alkyl group 110, and a quaternary nitrogen cation 111.

The reactive functional group 109 is formed at one terminal of the long chain alkyl group 110. The reactive functional group 109 has an affinity for the metal fine particle 107 and is chemically reacted with the metal fine particle 107 to be bound thereto. Thus, the reactive functional group 109 fixes the modified organic molecule 112 onto the surface of the metal fine particle 107. The reactive functional group 109 is preferably a functional group capable of being covalently bound, such as a thiol group, a disulfide group, and a thiocyanate group. Among them, a thiol group is more preferable because it has an excellent binding force.

The quaternary nitrogen cation 111 is formed at the other terminal of the long chain alkyl group 110. The quaternary nitrogen cation 111 has a function of promoting the $CO_2$ reduction reaction operating on the metal fine particle 107.

In the elementary reaction of the $CO_2$ reduction reaction, $CO_2$ becomes a $CO_2$ radical anion according to a reduction reaction of one electron. This reaction requires a large overvoltage. This overvoltage represents a loss of energy and causes lowering of an energy conversion efficiency. Further, reduction reactions of water and a hydrogen ion occur as side reactions together with the $CO_2$ reduction reaction to generate hydrogen. This side reaction lowers a Faraday efficiency of the $CO_2$ reduction reaction.

Meanwhile, the quaternary nitrogen cation 111 of the surface of the metal fine particle 107 forms a reaction intermediate with $CO_2$. Thus, the quaternary nitrogen cation 111 has an effect of contributing to generation and stabilization of a $CO_2$ radical anion and can cause the $CO_2$ reduction reaction with low energy consumption. Consequently, the energy conversion efficiency can be increased. Since the quaternary nitrogen cation 111 is fixed to the surface of the metal fine particle 107, it has an effect of preventing water and a hydrogen ion from approaching the metal fine particle 107. Namely, the quaternary nitrogen cation 111 can impart reaction selectivity to the metal fine particle 107. Thus, generation of hydrogen due to a side reaction is reduced, and the Faraday efficiency can be increased.

In the metal fine particle 107 having the quaternary nitrogen cation 111, a reduction product is changed by an interaction between the quaternary nitrogen cation 111 and the metal fine particle 107 and $CO_2$. Specifically, $CO_2$ is converted into carbon monoxide (CO), formic acid (HCOOH), formaldehyde (HCHO), and methanol ($CH_3OH$). Further, $CO_2$ may be converted into acetic acid ($CH_3COOH$), acetaldehyde ($CH_3CHO$), and ethanol ($CH_3CH_2OH$).

The quaternary nitrogen cation 111 is preferably ammonium cation, imidazole cation, pyridinium cation, piperidinium cation, or pyrrolidinium cation, for example. Among them, imidazole cation is preferable because it is excellent in enhancement of $CO_2$ reduction activity.

In a structure of the modified organic molecule 112, the quaternary nitrogen cation 111 and the reactive functional group 109 bound to the surface of the metal fine particle 107 may be bound through the long chain alkyl group 110 or may be bound directly to each other. If the quaternary nitrogen cation 111 and the reactive functional group 109 are bound through the long chain alkyl group 110, when the alkyl chain length is increased, the quaternary nitrogen cation 111 is less likely to take part in the $CO_2$ reaction reduction of the metal fine particle 107. Accordingly, the number of carbons in the alkyl chain length of the long chain alkyl group 110 is preferably 2 to 16.

Examples of the organic molecules constituting the organic molecular layer 106 and the modified organic molecule 112 include 15-carboxy-1-pentadecanethiol, 10-carboxy-1-decanethiol, 7-carboxy-1-heptanethiol, 5-carboxy-1-pentathiol, 3-carboxy-1-propanethiol, mercaptoacetic acid, 10-carboxydecyl-disulfide, 7-carboxyheptyl-disulfide, 5-carboxypentyl-disulfide, 4-4'-dithiodibutanoic acid, 16-amino-1-hexadecanethiol, 16-amino-1-hexadecanethiol, 11-amino-1-undecanethiol, 8-amino-1-octanethiol, 6-amino-1-hexanethiol, 11-mercaptoundecane-1-trimethyl-ammoniumchloride, 11-mercaptoundecane-1-sodium sulphonate, 11-mercaptoundecane-1-phosphonic acid, 1-(2-mercaptoethyl)-3-methylimidazolium bromide, 1-(2-mercaptoethyl)-3-methylimidazolium bromide, 1-(3-mercaptoproply)-3-methylimidazolium bromide, 1-(4-mercaptobutyl)-3-methylimidazolium bromide, 1-(4-mercaptobutyl)-3-methylimidazolium bromide, 1-(5-mercaptopentyl)-3-methylimidazolium bromide, 1-(6-mercaptohexyl)-3-methylimidazolium bromide, 1-(8-mercaptooctyl)-3-methylimidazolium bromide, 1-(9-mercaptononyl)-3-methylimidazolium bromide, 1-(10-mercaptodecyl)-3-methylimidazolium bromide, 1-(11-mercaptoundecyl)-3-methylimidazolium bromide, 1-(12-mercaptododecyl)-3-methylimidazolium bromide, 1-(2-mercaptoethyl)-3-ethylimidazolium bromide, 1-(4-mercaptobutyl)-2,3-dimethylimidazolium bromide, 1-(2-mercaptoethyl)-4-methylpyridinium bromide, 1-(3-mercaptoproply)-4-methylpyridinium bromide, 1-(4-mercaptobutyl)-4-methylpyridinium bromide, 1-(5-mercaptopentyl)-4-methylpyridinium bromide, 1-(6-mercaptopentyl)-4-methylpyridinium bromide, 1-(6-mercaptooctyl)-4-methylpyridinium bromide, 1-(9-mercaptononyl)-4-methylpyridinium bromide, 1-(10-mercaptodecyl)-4-methylpyridinium bromide, 1-(11-mercaptoundecyl)-4-methylpyridinium bromide, 1-(12-mercaptododecyl)-4-methylpyridinium bromide, 1-(4-mercaptobutyl)pyridinium bromide, 1-(2-mercaptoethyl)-1-methylpyrrolidinium bromide, 1-(3-mercaptoproply)-1-methylpyrrolidinium bromide, 1-(4-mercaptobutyl)-1-methylpyrrolidinium bromide, 1-(5-mercaptopentyl)-1-methylpyrrolidinium bromide, 1-(6-mercaptohexyl)-1-methylpyrrolidinium bromide, 1-(8-mercaptooctyl)-1-methylpyrrolidinium bromide, 1-(9-mercaptononyl)-1-methylpyrrolidinium bromide, 1-(10-mercaptodecyl)-1-methylpyrrolidinium bromide, 1-(11-mercaptoundecyl)-1-methylpyrrolidinium bromide, 1-(12-mercaptododecyl)-1-methylpyrrolidinium bromide, 1-(2-mercaptoethyl)-1-methylpiperidinium bromide, 1-(3-mercaptoproply)-1-methylpiperidinium bromide, 1-(4-mercaptobutyl)-1-methylpiperidinium bromide, 1-(5-mercaptopentyl)-1-methylpiperidinium bromide, 1-(6-mercaptohexyl)-1-methylpiperidinium bromide, 1-(8-mercaptooctyl)-1-methylpiperidinium bromide, 1-(9-mercaptononyl)-1-methylpiperidinium bromide, 1-(10-mercaptodecyl)-1-methylpiperidinium bromide, 1-(11-mercaptoundecyl)-1-methylpiperidinium bromide, 1-(12-mercaptododecyl)-1-methylpiperidinium bromide, 1,2-ethane dithiol, 1,3-propane dithiol, 1,4-butane dithiol, 1,5-pentane dithiol, 1,6-hexane dithiol, 1,7-heptane dithiol, 1,8-octane dithiol, 1,9-nonane dithiol, 1,10-decane dithiol, 1,11-undecane dithiol, 1,12-dodecane dithiol, 1,13-tridecane dithiol, 1,14-tetradecane dithiol, 1,15-pentadecane dithiol, and 1,16-hexadecane dithiol.

However, amine may form a salt such as hydrofluoric acid, hydrochloric acid, oxalic acid, folic acid, sulfuric acid, nitric acid, and phosphoric acid. A counter anion of a quaternary nitrogen cation such as an ammonium salt, imidazolium salt, pyridinium salt, pyrrolidinium salt, and piperidinium salt may be a fluoride ion, a chloride ion, a bromide ion, an iodide ion, $HCO_3^-$, $BF_4^-$, $PF_6^-$, $CF_3COO^-$, $CF_3SO_3^-$, $NO_3^-$, $SCN^-$, $N(CN)_2^-$, $(CN)_3^-(CF_3SO_2)_3C^-$, bis(trifluoromethoxysulfonyl)imide anion, or bis(perfluoroethylsulfonyl)imide anion.

[Production Process]

As a method of forming the organic molecular layer 106 on the surface (surface layer 102) of the charge collector 101, a known method may be used. For example, there are exemplified a method of bringing the charge collector 101 into contact with a solution dissolved with organic molecules having an affinity for the charge collector 101, a method of evaporating organic molecules in a high vacuum and forming a film, and a method of spraying organic molecules by a spray or the like.

In the method of bringing the charge collector 101 into contact with a solution dissolved with organic molecules, the organic molecules chemically adsorbed to the charge collector 101 spontaneously form an aggregate by a van der Waals force and hydrophobic interaction between adsorbed molecules. The adsorbed molecules are aggregated densely, whereby an aligned monomolecular layer (Self-Assembled Monolayer: SAM) is formed.

A solvent dissolving organic molecules is not limited as long as it can dissolve the organic molecules. Examples of the solvent dissolving organic molecules include alcohols, such as ethanol, and aromatic or aliphatic organic solvents such as toluene and hexane. Ethanol is preferably used for reasons of the solubility of organic molecules and ease of handling.

An example of a method of forming the organic molecular layer 106 on the surface (surface layer 102) of the charge collector 101 will be hereinafter described in detail.

An ethanol solution dissolved with organic molecules is provided, and the charge collector 101 formed with the surface layer 102 is immersed for from several minutes to several hours. Consequently, the organic molecular layer 106 is formed on the surface of the charge collector 101. Since the conditions such as the concentration of the organic molecules, the immersion time, and an immersion temperature influence a formation state of a monomolecular layer, they may be suitably changed according to the structure of the organic molecule and so on.

For example, concerning the concentration, if the concentration of the organic molecules is low, it takes time to form a monomolecular layer. Meanwhile, if the concentration of the organic molecules is too high, excess molecules may be stacked and adsorbed on the monomolecular layer. Thus, the concentration of the organic molecules is preferably not more than 0.1 mM and not more than 100 mM and more preferably not less than 1 mM and not more than 10 mM. Concerning the immersion time, although the adsorption of the organic molecules is completed within several minutes, a longer time is required for formation of a more dense and aligned monomolecular layer. Thus, the immersion time is preferably not less than 1 minute and not more than 100 hours and more preferably not less than 12 hours and not more than 72 hours. The immersion temperature influences formation of a dense and aligned single molecule. Thus, the immersion temperature is preferably not less than room temperature and not more than 60° C. considering the vapor pressure and boiling point of a solvent and so on.

As a method of confirming the formation of the organic molecular layer 106, known methods may be used.

For example, as an electrochemical method, evaluation is performed by a cyclic voltammetry method. More specifically, in a 0.2 M potassium chloride (KCl) aqueous solution dissolved with potassium hexacyanoferrate (III) ($K_3[Fe(CN)_6]$) of 1 mM or hexaammineruthenium (III) chloride ($[Ru(NH_3)_6]Cl_3$) of 1 mM, an electrochemical response of the charge collector 101 before and after a process of adsorbing the organic molecular layer 106 is measured and compared. Consequently, reduction in a reaction current due to an electrochemical oxidation-reduction reaction of hexacyanoferrate (III) anion and hexaammineruthenium (III) cation can be observed by the formation of the organic molecular layer 106. This is caused by the fact that the formation of the organic molecular layer 106 on the charge collector 101 inhibits the oxidation-reduction reaction of hexacyanoferrate (III) anion and hexaammineruthenium (III) cation. According to this constitution, the formation of the organic molecular layer 106 can be confirmed indirectly.

Evaluation can be performed by using a Fourier transform infrared spectrophotometer (FT-IR) using a reflection method as a surface analysis method. Consequently, an infrared spectrum of a thin film and molecular adsorption species on the surface of the charge collector 101 can be measured with high sensitivity. Namely, a structure of an organic molecule, in particular information on a functional group can be known. If an X-ray photoemission spectroscopy (XPS) is used, when the organic molecular layer 106 and the modified organic molecule 112 are provided with anions, the composition of anions can be measured. If a contact angle meter is used, presence and absence of the organic molecular layer 106 can be measured from differences in water wettability.

As a method of fixing the metal fine particle 107 onto the surface of the organic molecular layer 106, known methods may be used. For example, when the charge collector 101 formed with the organic molecular layer 106 is immersed in a solution dispersed with the particles of the metal fine particle 107, the reactive functional group 105 of the organic molecular layer 106 and the surface (organic molecule 108) of the metal fine particle 107 are reacted with each other and fixed.

A solution dispersed with the metal fine particles 107 is not limited as long as the metal fine particles 107 are stably dispersed. Examples of the solution dispersed with the metal fine particles 107 include water, ethanol, and toluene. Water or ethanol is preferably used for reasons of ease of handling.

An example of a method of fixing the metal fine particles 107 onto the surface of the organic molecular layer 106 will be hereinafter described in detail. An aqueous solution dispersed with the metal fine particles 107 is provided, and the charge collector 101 formed with the organic molecular layer 106 is immersed for several hours. Consequently, the metal fine particles 107 can be fixed onto the surface of the organic molecular layer 106. Since the conditions such as the concentration of the solution dispersed with the metal fine particles 107, the immersion time, an immersion temperature, and so on depend on a method of synthesizing the metal fine particles 107 and stability, they may be suitably changed for each dispersion solution.

For example, concerning the concentration, if the concentration of the metal fine particles 107 is low, it takes time to fix the metal fine particles 107. Meanwhile, if the concentration of the metal fine particles 107 is too high, the metal fine particles 107 are flocculated and may not be fixed to the organic molecular layer 106. Further, concerning the immersion time, the longer immersion time allows more satisfactory fixation of the metal fine particles 107. Thus, the immersion time is preferably not less than 1 hour and not more than 50 hours and more preferably not less than 5 hours and not more than 24 hours. If the immersion temperature is increased, dispersion stability of the metal fine particles 107 may be lowered, so that the metal fine particles 107 may be flocculated. If the metal fine particles 107 are flocculated, it is difficult to evenly fix the metal fine particles 107 to the surface of the organic molecular layer 106. Thus, the immersion temperature is preferably not less than room temperature and not more than 35° C.

As a method of confirming the fixing of the metal fine particle 107 on the surface of the organic molecular layer 106, known methods may be used.

For example, as an electrochemical method, evaluation is performed by a cyclic voltammetry method. More specifically, in a 0.2 M potassium chloride (KCl) aqueous solution dissolved with potassium hexacyanoferrate (III) ($K_3$[Fe(CN)$_6$]) of 1 mM or hexaammineruthenium (III) chloride ([Ru(NH$_3$)$_6$]Cl$_3$) of 1 mM, an electrochemical response of the charge collector 101 before and after a process of fixing the metal fine particles 107 is measured and compared. Consequently, an increase in reaction current due to an electrochemical oxidation-reduction reaction of hexacyanoferrate (III) anion and hexaammineruthenium (III) cation can be observed by the fixing of the metal fine particles 107. This is caused by the fact that the fixing of the metal fine particles 107 onto the organic molecular layer 106 causes the oxidation-reduction reaction of hexacyanoferrate (III) anion and hexaammineruthenium (III) cation. According to this constitution, the fixing of the metal fine particles 107 can be confirmed indirectly.

As a surface analysis method, direct observation can be performed with a scanning electron microscope (SEM), a transmission electron microscope (TEM), an atomic force microscope (AFM), or a scanning transmission electron microscope (STEM). A metal composition can be evaluated by an energy dispersive X-ray analysis (EDX), an electron beam microanalyzer (EPMA), X-ray photoemission spectroscopy (XPS), or the like.

As a method of modifying the modified organic molecule 112 containing the quaternary nitrogen cation 111 onto the surface of the metal fine particle 107, known methods may be used. For example, the surface of the metal fine particle 107 and the modified organic molecule 112 are reacted by bringing the metal fine particle 107 into contact with a solution dissolved with the modified organic molecule 112 having an affinity for the metal fine particle 107.

A solvent dissolving the modified organic molecules 112 is not limited as long as it can dissolve modified organic molecules. Examples of the solvent dissolving the modified organic molecules 112 include alcohols, such as ethanol, and aromatic or aliphatic organic solvents such as toluene and hexane. Ethanol is preferably used for reasons of the solubility of the modified organic molecules 112 and ease of handling.

An example of a method of modifying the modified organic molecule 112 containing the quaternary nitrogen cation 111 on the surface of the metal fine particle 107 will be hereinafter described in detail. An ethanol solution dissolved with the modified organic molecules 112 is provided, and the metal fine particles 107 are immersed for from several minutes to several hours. Consequently, a modified molecular layer 112 can be formed on the surface of the metal fine particle 107. Since the conditions such as the concentration of the modified organic molecules 112, the immersion time, and an immersion temperature influence a formation state of the modified organic molecular layer 112, they may be suitably changed according to the structure of the modified organic molecule 112 and so on.

For example, concerning the concentration, if the concentration of the modified organic molecules 112 is low, it takes time to form the modified organic molecule 112. Meanwhile, if the concentration of the modified organic molecules 112 is too high, excess molecules may be stacked and adsorbed on the modified organic molecule 112. Thus, the concentration of the modified organic molecules 112 is preferably not more than 0.1 mM and not more than 100 mM and more preferably not less than 1 mM and not more than 10 mM. Concerning the immersion time, although the adsorption of the modified organic molecules 112 is completed in a few minutes, a longer time is required for formation of more dense and aligned modified organic molecules 112. Thus, the immersion time is preferably not less than 1 minute and not more than 100 hours and more preferably not less than 12 hours and not more than 72 hours. The immersion temperature influences formation of dense and aligned modified organic molecules 112. Thus, the immersion temperature is preferably not less than room temperature and not more than 60° C. considering the vapor pressure and boiling point of a solvent and so on.

The metal fine particle 107 may be stacked on the modified organic molecule 112. When the metal fine particle 107 is further stacked, the process of fixing the metal fine particle 107 and the process of forming the modified organic molecule 112 are repeated, whereby the amount of the modified organic molecules 107 can be increased.

An example of the method of stacking the metal fine particle 107 and the modified organic molecule 112 will be hereinafter described in detail.

The modified organic molecule 112 has a positive charge of the quaternary nitrogen cation 111. Thus, if the modified organic molecule 112 is in contact with an aqueous solution dissolved with an anion containing an element constituting the metal fine particle 107, the quaternary nitrogen cation 111 and the anion containing an element constituting the metal fine particle 107 are electrostatically coupled by an anion exchange reaction. When electrochemical reduction or reduction by hydrogen gas is performed in an aqueous solution, a metal nanoparticle as the metal fine particle 107 can be carried on the surface of the quaternary nitrogen cation 111.

Examples of the metal fine particle 107 which can be precipitated near the quaternary nitrogen cation 111 include Au and Pt. As a raw material of an anion containing Au or Pt, there are exemplified salts such as tetrachloro-gold (III) acid sodium dihydrate (Na[AuCl$_4$]2H$_2$O), gold chloride (III) acid potassium (K[AuCl$_4$]), tetrachloro platinic acid (II) potassium (K$_2$[PtCl$_4$]), and hexachloro platinic acid (IV) potassium (K$_2$[PtCl$_6$]).

More specifically, in a method of carrying the metal fine particle 107 by utilizing the quaternary nitrogen cation 111 contained in the modified organic molecule 112, a substrate provided with the metal fine particle 107 modified with the modified organic molecule 112 is immersed in a solution dissolved with an anion containing Au or Pt, and anion exchange is performed. The anion exchange is performed so that in an aqueous solution in which the concentration of salt constituted of anions containing Au or Pt is not less than 0.1 mM and not more than 100 mM, an anion exchange time is not less than 30 minutes and not more than 2 hours. Consequently, the anion containing Au or Pt is electrostatically coupled to the quaternary nitrogen cation 111.

After that, this substrate is immersed in an alkaline aqueous solution and electrochemically reduced, or the substrate is immersed in an aqueous solution dissolved with $H_2$ gas and reduced. If the substrate is electrochemically reduced, constant potential reduction electrolysis is performed in a sodium hydrogen carbonate aqueous solution having a concentration of 0.5 M. As the electrolysis conditions, in a three-electrode type cell in which a substrate is a working electrode, a reference electrode is a silver-silver chloride electrode, a counter electrode is Pt, and a potential of −0.5 V is applied to the working electrode for approximately one hour. Meanwhile, if the substrate is immersed in an aqueous solution dissolved with $H_2$ gas and reduced, the substrate may be immersed for approximately one hour. Consequently, the metal fine particle 107 can be formed on the surface of the quaternary nitrogen cation 111.

After that, the modified organic molecule 112 containing the quaternary nitrogen cation 111 can be further modified on a surface of an Au or Pt nanoparticle (metal fine particle 111) precipitated near the quaternary nitrogen cation 111 by the above method.

In this way, when the metal fine particle 107 is further stacked, the amount of the metal fine particles 107 can be increased by repeating the process of precipitating the metal fine particle 107 near the quaternary nitrogen cation 111 and the process of binding the modified organic molecule 112.

[Effect]

In the present embodiment, the metal fine particle 107 is fixed onto the surface (surface layer 102) of the charge collector 101 through the organic molecular layer 106, and the modified organic molecule 112 is formed on the surface of the metal fine particle 107. Then, the $CO_2$ reduction reaction is performed in the metal fine particle 107. Consequently, the following effects can be obtained.

The formation of the metal fine particle 107 can make a reactive area (surface area) larger than that of a plate-shaped metal layer. Consequently, the $CO_2$ reduction reaction efficiency can be increased. Further, the modified organic molecule 112 contributes to enhancement of the $CO_2$ reduction activity. In other words, the modified organic molecule 112 can selectively advance the $CO_2$ reduction reaction with low energy with respect to the $CO_2$ reduction reaction. Thus, the formation of the modified organic molecule 112 can further increase the $CO_2$ reduction reaction efficiency.

[Variation 1]

Figure 3:
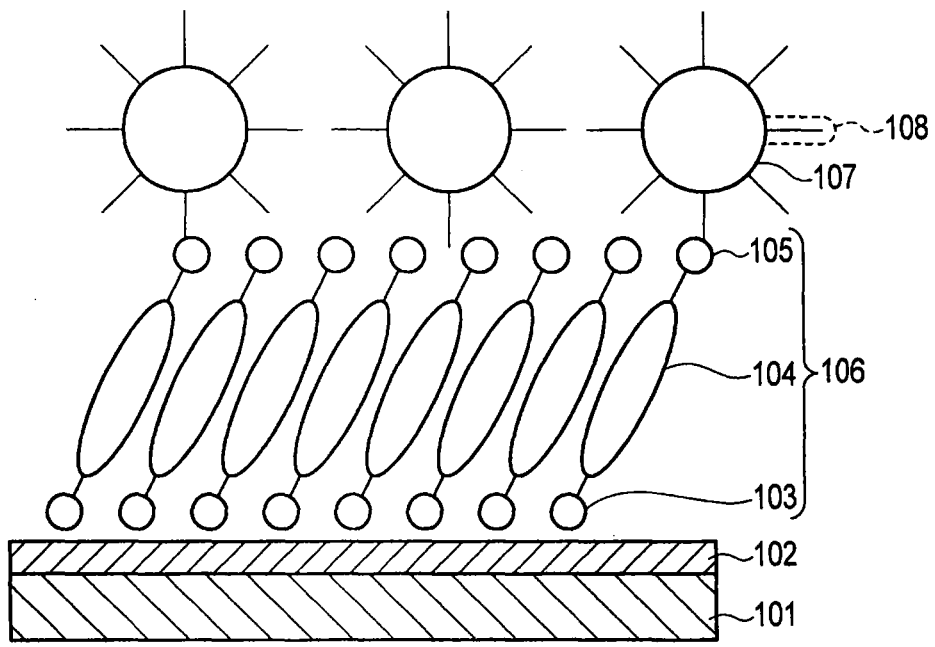
FIG. 3 is a view showing a variation 1 of the configuration of the $CO_2$ reduction catalyst according to the embodiment.

FIG. 3 is a view showing a variation 1 of a configuration of the $CO_2$ reduction catalyst according to the present embodiment.

As shown in FIG. 3, a $CO_2$ reduction catalyst according to the variation 1 is provided with a laminate constituted of a charge collector 101, an organic molecular layer 106, and a metal fine particle 107. Namely, the $CO_2$ reduction catalyst according to the variation 1 is different from the $CO_2$ reduction catalyst according to the above-described present embodiment in that the modified organic molecule 112 for promoting the $CO_2$ reduction reaction is not formed. Hereinafter, the variation 1 will be detailed.

In the charge collector 101, a surface layer 102 constituted of a metal layer or an oxide layer is formed on a surface of the charge collector 101. If the surface layer 102 is constituted of a metal layer, the surface layer 102 is constituted of a metal layer containing at least one element selected from the group consisting of Au, Ag, Cu, Pt, Zn, Fe, Ti, Sn, In, Bi, and Ni. Meanwhile, if the surface layer 102 is constituted of an oxide layer, the surface layer 102 is constituted of an oxide layer containing titanium oxide ($TiO_2$), zirconium oxide ($ZrO_2$), aluminum oxide ($Al_2O_3$), silicon oxide ($SiO_2$), zinc oxide (ZnO), tin-doped indium oxide (ITO), fluorine-doped tin oxide (FTO), or the like.

The organic molecular layer 106 is chemically bound to the surface (surface layer 102) of the charge collector 101. The organic molecular layer 106 is chemically adsorbed onto the surface of the charge collector 101 and is a single layer film formed by self-organization. The organic molecular layer 106 has a function of fixing and electrically connecting the metal fine particles 107 to the charge collector 101. The organic molecular layer 106 has a long chain alkyl group 104 and reactive functional groups 103 and 105 bound to the respective terminals of the long chain alkyl group 104.

The metal fine particles 107 are chemically bound to the surface (reactive functional group 105) of the organic molecular layer 106. The metal fine particle 107 is provided with an organic molecule (reactive functional group) 108 having an electrical charge at a part of its surface and thereby charged. The electrical charge on the surface of the metal fine particle 107 generates electrostatic repulsion between the particles and can prevent the nano-particle sized fine particles from being flocculated and coarse. The metal fine particles 107 can be fixed onto the surface of the organic molecular layer 106 by electrostatic attraction (electrostatic coupling) using the electrical charge on the surface of the metal fine particle 107 and the electrical charge of the reactive functional group 105 in the organic molecular layer 106.

The metal fine particle 107 is a catalyst for activating the $CO_2$ reduction reaction and is a metal containing at least one element selected from the group consisting of Au, Ag, Cu, Pt, Zn, Fe, Ti, Sn, In, Bi, and Ni. As the metal fine particle 107, commercially available metals may be suitably selected, and among them, Au or Ag having high catalytic activity is preferably selected.

[Variation 2]

Figure 4:
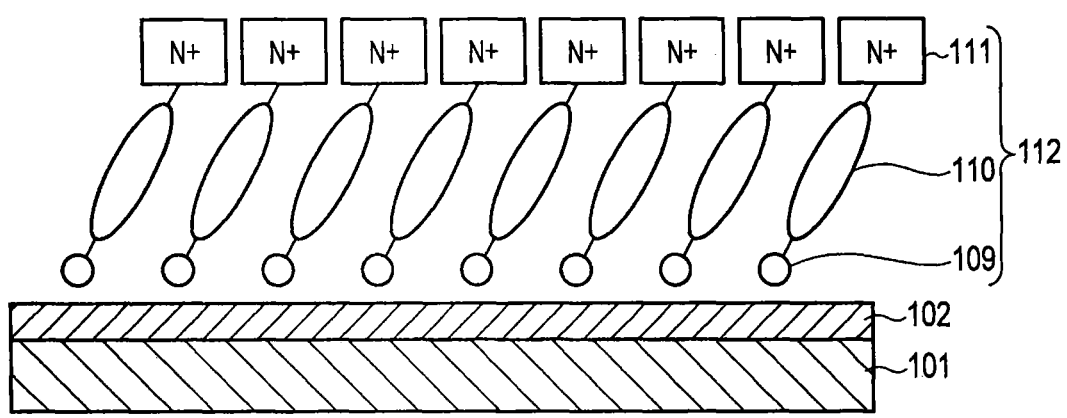
FIG. 4 is a view showing a variation 2 of the configuration of the $CO_2$ reduction catalyst according to the embodiment.

FIG. 4 is a view showing a variation 2 of a configuration of the $CO_2$ reduction catalyst according to the present embodiment.

As shown in FIG. 4, a $CO_2$ reduction catalyst according to the variation 2 is provided with a laminate constituted of a charge collector 101 and modified organic molecules 112. Namely, the $CO_2$ reduction catalyst according to the variation 2 is different from the $CO_2$ reduction catalyst according to the above-described present embodiment in that the organic molecular layer 106 and the metal fine particle 107 are not formed. Hereinafter, the variation 2 will be detailed.

A surface layer 102 constituted of a metal layer is formed on a surface of the charge collector 101. The surface layer 102 is constituted of a metal layer containing at least one element selected from the group consisting of Au, Ag, Cu, Zn, and Pt. The metal layer constituting the surface layer 102 corresponds to metal fine particles and is a catalyst for activating the $CO_2$ reduction reaction. Namely, the surface layer 102 constituted of metal fine particles has the same functions as those of the metal fine particle 107 in the above embodiment.

The surface layer 102 (metal fine particle) is provided with an organic molecule having an electrical charge at a part of its surface and thereby charged. The electrical charge on the surface of the metal fine particle generates electrostatic repulsion between the particles and can prevent the nano-particle sized fine particles from being flocculated and coarse.

If a metal fine particle is a nano-fine particle, it has high catalytic activity efficiency. Thus, an average particle diameter of the metal fine particles is preferably not more than 300 nm, for example. This is because if the average particle diameter of the metal fine particles is more than 300 nm, the activity efficiency of the metal fine particles is significantly lowered. The average particle diameter of the metal fine particles is preferably not less than 1 nm and not more than 150 nm. The upper limit is determined considering the above activity efficiency. Meanwhile, the lower limit is determined considering the difficulty in a fine particle production process.

As the metal fine particles, fine particles having an average particle diameter of not more than 50 nm may be used alone, or an aggregate of primary particles (secondary particles) comprising these fine particles may be used.

The modified organic molecule 112 is chemically bound to the surface of the surface layer 102. The modified organic molecule 112 has a reactive functional group 109, a long chain alkyl group 110, and a quaternary nitrogen cation 111.

The reactive functional group 109 is formed at one terminal of the long chain alkyl group 110. The reactive functional group 109 has an affinity for the surface layer 102 and chemically reacts with the surface layer 102 to be bound thereto. Thus, the reactive functional group 109 fixes the modified organic molecule 112 onto the surface of the surface layer 102. The reactive functional group 109 is preferably a functional group capable of being covalently bound, such as a thiol group, a disulfide group, and a thiocyanate group. Among them, a thiol group is more preferable because it has an excellent binding force.

The quaternary nitrogen cation 111 is formed at the other terminal of the long chain alkyl group 110. The quaternary nitrogen cation 111 has a function of promoting the $CO_2$ reduction reaction operating on the surface layer 102 constituted of metal fine particles.

The quaternary nitrogen cation 111 is preferably an ammonium cation, imidazole cation, pyridinium cation, piperidinium cation, or pyrrolidinium cation, for example. Among them, the imidazole cation is preferable because it is excellent in enhancement of activity of $CO_2$ reduction.

2. Photochemical Reaction Cell

Hereinafter, a photochemical reaction cell using the $CO_2$ reduction catalyst according to the present embodiment will be described using FIGS. 5 to 7.

Figure 5:
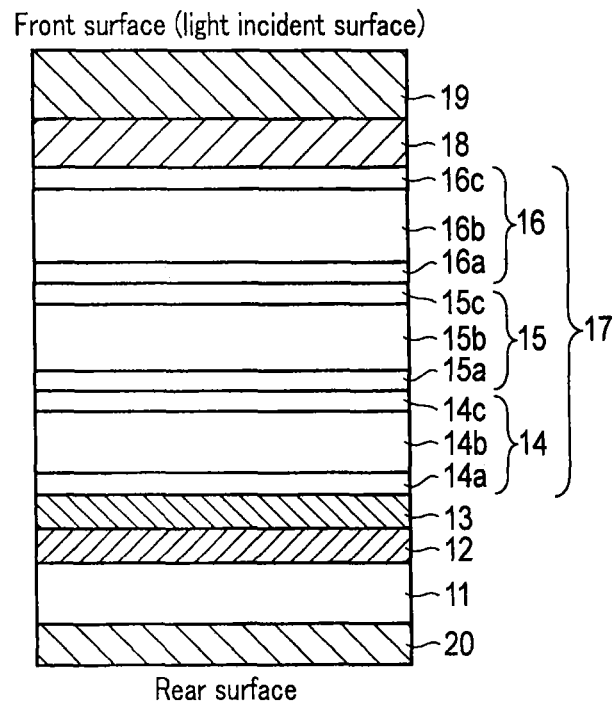
FIG. 5 is a cross-sectional view showing a structure of a photochemical reaction cell according to the embodiment.

FIG. 5 is a cross-sectional view showing a configuration of the photochemical reaction cell according to the present embodiment.

As shown in FIG. 5, the photochemical reaction cell according to the present embodiment is provided with a laminate constituted of a substrate 11, a reflecting layer 12, a reduction electrode layer 13, a multi-junction solar cell 17, an oxidation electrode layer 18, an oxidation catalyst layer 19, and a reduction catalyst layer 20.

Although the details will be described later, the above-described $CO_2$ reduction catalyst is applied as the reduction catalyst layer 20 in the photochemical reaction cell.

The reflecting layer 12, the reduction electrode layer 13, the multi-junction solar cell 17, the oxidation electrode layer 18, and the oxidation catalyst layer 19 are formed on a front surface of the substrate 11. Meanwhile, the reduction catalyst layer 20 is formed on a rear surface of the substrate 11.

The substrate 11 is provided for the purpose of supporting the photochemical reaction cell and increasing the mechanical strength. The substrate 11 has conductivity and is constituted of a metal plate of, for example, Au, Ag, Cu, Pt, Zn, Fe, Ti, Sn, In, Bi, or Ni or an alloy plate, such as SUS, containing at least one of them. Alternatively, the substrate 11 may be formed of a conductive resin or the like. Meanwhile, the substrate 11 may be constituted of a semiconductor substrate such as Si or Ge. As described later, the substrate 11 may be formed of an ion exchange membrane.

The reflecting layer 12 is formed on the surface of the substrate 11. The reflecting layer 12 is formed of a light reflectable material and constituted of a distributed Bragg reflecting layer including, for example, a metal layer or a semiconductor multilayer film. When the reflecting layer 12 is formed between the substrate 11 and the multi-junction solar cell 17, light that could not be absorbed by the multi-junction solar cell 17 is reflected to be allowed to enter the multi-junction solar cell 17 again. Consequently, the light absorptivity in the multi-junction solar cell 17 can be enhanced.

The reduction electrode layer 13 is formed on the reflecting layer 12. The reduction electrode layer 13 is formed on a surface of an n-type semiconductor layer (n-type amorphous silicon layer 14a to be described later) of the multi-junction solar cell 17. Thus, the reduction electrode layer 13 is preferably formed of a material which can be in ohmic contact with an n-type semiconductor layer. The reduction electrode layer 13 is formed of metal such as Ag, Au, Al, or Cu or alloy containing at least one of the metals. Alternatively, the reduction electrode layer 13 is constituted of a transparent conductive oxide such as ITO (Indium Tin Oxide), zinc oxide (ZnO), FTO (fluorine-doped tin oxide), AZO (aluminum-doped zinc oxide), or ATO (antimony-doped tin oxide). The reduction electrode layer 13 may have a structure in which metal and a transparent conductive oxide are stacked, a structure in which metal and another type of conductive material are compounded, or a structure in which a transparent conductive oxide and another type of conductive material are compounded, for example.

The multi-junction solar cell 17 is formed on the reduction electrode layer 13 and is constituted of a first solar cell 14, a second solar cell 15, and a third solar cell 16. The first solar cell 14, the second solar cell 15, and the third solar cell 16 are solar cells each using a pin junction semiconductor and have different light absorption wavelengths. When they are stacked in a planar fashion, the multi-junction solar cell 17 can absorb wide wavelength light of solar light, and solar light energy can be used more efficiently. Since the solar cells are connected in series, a high open voltage can be obtained.

More specifically, the first solar cell 14 is constituted of an n-type amorphous silicon (a-Si) layer 14a, an intrinsic amorphous silicon germanium (a-SiGe) layer 14b, and a p-type microcrystalline silicon (μc-Si) layer 14c formed sequentially from the lower side. Here, the a-SiGe layer 14b is a layer absorbing light in a short wavelength region of approximately 400 nm. Namely, in the first solar cell 14, light energy in the short wavelength region causes charge separation.

The second solar cell 15 is constituted of an n-type a-Si layer 15a, an intrinsic a-SiGe layer 15b, and a p-type μc-Si layer 15c formed sequentially from the lower side. Here, the a-SiGe layer 15b is a layer absorbing light in an intermediate wavelength region of approximately 600 nm. Namely, in the second solar cell 15, light energy in the intermediate wavelength region causes charge separation.

The third solar cell 16 is constituted of an n-type a-Si layer 16a, an intrinsic a-Si layer 16b, and a p-type μc-Si layer 16c formed sequentially from the lower side. Here, the a-Si layer 16b is a layer absorbing light in a long wavelength region of approximately 700 nm. Namely, in the third solar cell 16, light energy in the long wavelength region causes charge separation.

As described above, in the multi-junction solar cell 17, the light in each wavelength region causes the charge separation. Namely, a hole is separated to a positive electrode side (front surface side), and an electron is separated to a negative electrode side (rear surface side). According to this constitution, the multi-junction solar cell 17 generates an electromotive force.

Although the multi-junction solar cell 17 constituted of a laminated structure of the three solar cells has been described as an example, this invention is not limited thereto. The multi-junction solar cell 17 may be constituted of a laminated structure of two or four or more solar cells. Alternatively, a solar cell may be used instead of the multi-junction solar cell 17. Although the solar cell using a pin junction semiconductor has been described, a solar cell using a pn junction semiconductor may be used instead.

Although the example in which the semiconductor layer is formed of Si and Ge has been shown, the material is not limited to them, and the semiconductor layer may be formed of compound semiconductor systems such as GaAs, GaInP, AlGaInP, CdTe, and CuInGaSe. Furthermore, various forms such as a single crystal, a polycrystal, and an amorphous form can be applied.

The oxidation catalyst layer 19 is formed on the oxidation electrode layer 18. The oxidation catalyst layer 19 is formed on the positive electrode side of the multi-junction solar cell 17. In the oxidation catalyst layer, if a hydrogen ion concentration of an electrolytic solution is less than 7 (pH<7), $H_2O$ is oxidized to produce $O_2$ and $H^+$. Meanwhile, if the hydrogen ion concentration of the electrolytic solution is more than 7 (pH>7), $OH^-$ is oxidized to produce $O_2$ and $H_2O$. Thus, the oxidation catalyst layer 19 is formed of a material that reduces the activation energy of the oxidation reaction. In other words, the oxidation catalyst layer 19 is formed of a material which lowers the overvoltage when a reaction in which $H_2O$ or $OH^-$ is oxidized to extract electrons is carried out. Examples of such a material include binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), or ruthenium oxide (Ru—O), ternary metal oxides such as Ni—Co—O, La—Co—O, Ni—La—O, and Sr—Fe—O, quaternary metal oxides such as Pb—Ru—Ir—O and La—Sr—Co—O, and metal complexes such as an Ru complex and an Fe complex. The form of the oxidation catalyst layer 19 is not limited to a thin film form, and the oxidation catalyst layer 19 may have a lattice shape, a particle shape, or a wire shape.

In this example, as with the oxidation electrode layer 18, irradiation light passes through the oxidation catalyst layer 19 to reach the multi-junction solar cell 17. Thus, the oxidation catalyst layer 19 arranged on the light irradiation surface side has optical transparency with respect to the irradiation light. More specifically, the transparency of the oxidation catalyst layer 19 on the light irradiation surface side is at least 10% of the irradiation amount of the irradiation light and more preferably not less than 30%.

The reduction catalyst layer 20 is formed on the rear surface of the substrate 11. The reduction catalyst layer 20 is formed on the negative electrode side of the multi-junction solar cell 17 and reduces $CO_2$ to produce a carbon compound (such as carbon monoxide, formic acid, formaldehyde, methane, methanol, acetic acid, acetaldehyde, and ethanol). Thus, the reduction catalyst layer 20 is formed of a material that reduces the activation energy for reducing $CO_2$.

As this type of the reduction catalyst layer 20 the above-described $CO_2$ reduction catalyst is applied. Namely, the reduction catalyst layer 20 is provided with a laminate constituted of the charge collector 101, the organic molecular layer 106, the metal fine particle 107, and the modified organic molecule 112. The metal fine particle 107 is connected to the charge collector 101 through the organic molecular layer 106, and the modified organic molecule 112 for promoting the $CO_2$ reduction reaction is bound to the surface of the metal fine particle 107. The charge collector 101 and the substrate 11 may be the same as each other.

A protective layer may be arranged on a surface of the multi-junction solar cell 17 or between an electrode layer and a catalyst layer (in this example, between the oxidation electrode layer 18 and the oxidation catalyst layer 19) on the light irradiation surface side. The protective layer has conductivity and prevents corrosion of the multi-junction solar cell 17 in an oxidation reduction reaction. Consequently, the life of the multi-junction solar cell 17 can be extended. The protective layer has optical transparency according to need. As the protective layer, there are exemplified dielectric thin films of, for example, $TiO_2$, $ZrO_2$, $Al_2O_3$, $SiO_2$, and $HfO_2$. The film thickness of the protective layer is preferably not more than 10 nm and more preferably not more than 5 nm in order to obtain conductivity due to a tunnel effect.

Figure 6:
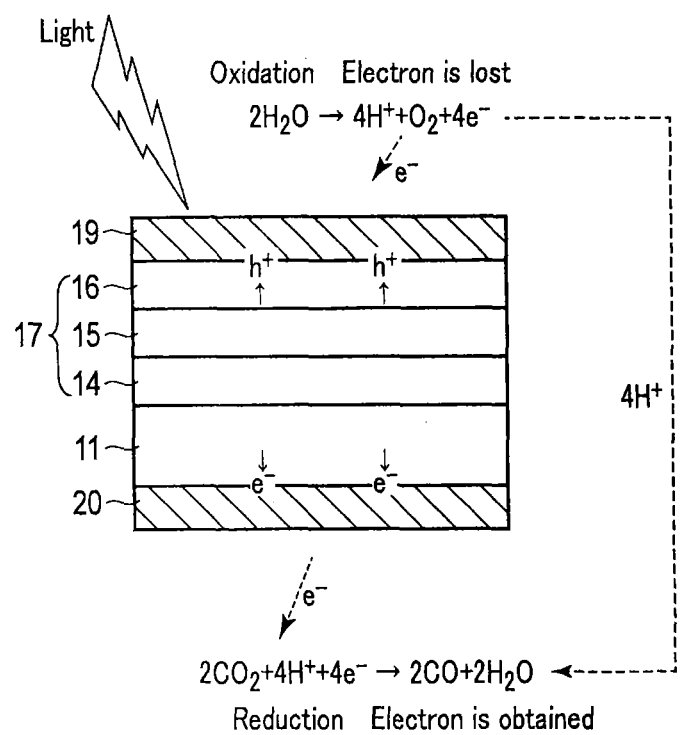
FIG. 6 is a cross-sectional view showing an example of an operating principle of the photochemical reaction cell according to the embodiment.

FIG. 6 is a cross-sectional view showing an example of an operating principle of the photochemical reaction cell according to the present embodiment. FIG. 7 is a cross-sectional view showing another example of the operating principle of the photochemical reaction cell according to this embodiment. In this example, the reflecting layer 12, the reduction electrode layer 13, and the oxidation electrode layer 18 are omitted.

As shown in FIGS. 6 and 7, when light enters from the front surface side, the incident light passes through the oxidation catalyst layer 19 and the oxidation electrode layer 18 to reach the multi-junction solar cell 17. The multi-junction solar cell 17 which has absorbed the light generates photoexcited electrons and holes paired therewith and separates them. Namely, in each solar cell (the first solar cell 14, the second solar cell 15, and the third solar cell 16), there occurs charge separation in which the photoexcited electrons move toward an n-type semiconductor layer (the reduction catalyst layer 20), and the holes generated as a pair with the photoexcited electrons move toward a p-type semiconductor layer (the oxidation catalyst layer 19). Consequently, the electromotive force is generated in the multi-junction solar cell 17.

As described above, the photoexcited electrons generated in the multi-junction solar cell 17 are used in a reduction reaction in the reduction catalyst layer 20, which is a negative electrode, and the holes are used in an oxidation reaction in the oxidation catalyst layer 19, which is a positive electrode. According to this constitution, as shown in FIG. 6, the reaction in formula (1) occurs near the oxidation catalyst layer 19, and the reaction in formula (2) occurs near the reduction catalyst layer 20. However, the formulae (1) and (2) refer to reactions using an acid solution in which the hydrogen ion concentration in an electrolytic solution is less than 7.

$$2H_2O \rightarrow 4H^+ + O_2 + 4e^- \quad (1)$$

$$2CO_2 + 4H^+ + 4e^- \rightarrow 2CO + 2H_2O \quad (2)$$

As shown in the formula (1), in the vicinity of the oxidation catalyst layer 19, $H_2O$ is oxidized to produce $O_2$, $H^+$, and electrons. $H^+$ produced on the oxidation catalyst layer 19 side moves toward the reduction catalyst layer 20 through an ion moving path to be described later.

As shown in the formula (2), in the vicinity of the reduction catalyst layer 20, $CO_2$ is reduced by $H^+$ which has moved and the electrons to produce carbon monoxide (CO) and $H_2O$.

Meanwhile, as shown in FIG. 7, when a basic solution in which the hydrogen ion concentration in an electrolytic solution is more than 7 is used, the reaction in formula (3) occurs near the oxidation catalyst layer 19, and the reaction in formula (4) occurs near the reduction catalyst layer 20.

$$4OH^- \rightarrow O_2 + 2H_2O + 4e^- \quad (3)$$

$$2CO_2 + 2H_2O + 4e^- \rightarrow 2CO + 4OH^- \quad (4)$$

As shown in the formula (4), in the vicinity of the reduction catalyst layer 20, a reduction reaction of $CO_2$ and $H_2O$ is carried out for obtaining electrons, and carbon monoxide (CO) and $OH^-$ are produced. $OH^-$ produced on the reduction catalyst layer 20 side moves toward the oxidation catalyst layer 19 through the ion moving path to be described later.

As shown in the formula (3), in the vicinity of the oxidation catalyst layer 19, $OH^-$ is oxidized to produce $O_2$ and $H_2O$.

At that time, the multi-junction solar cell 17 is required to have an open voltage not less than a potential difference between a standard oxidation-reduction potential in the oxidation reaction occurring in the oxidation catalyst layer 19 and a standard oxidation-reduction potential in the oxidation reaction occurring in the reduction catalyst layer 20. For example, when the hydrogen ion concentration (pH) of a reaction solution=0, the standard oxidation-reduction potential in the oxidation reaction in the formula (1) is +1.23 [V], and the standard oxidation-reduction potential in the oxidation reaction in the formula (2) is −0.1 M. Thus, the open voltage of the multi-junction solar cell 17 is required to be not less than 1.33 M. More preferably, the open voltage is required to be not less than a potential difference including an overvoltage. More specifically, when the overvoltage in the oxidation reaction in the formula (1) and the overvoltage in the reduction reaction in the formula (2) are each 0.2 [V], the open voltage is preferably not less than 1.73 Dn.

In the reduction reaction from $CO_2$ to CO shown in the formulae (2) and (4) and the reduction reaction from $CO_2$ to HCOOH, HCHO, $CH_4$, $CH_3OH$, $C_2H_5OH$, or the like, $H^+$ is consumed, or $OH^-$ is produced. Thus, if $H^+$ produced in the oxidation catalyst layer 19 cannot move to the reduction catalyst layer 20 as the counter electrode layer, or if $OH^-$ produced in the reduction catalyst layer 20 cannot move to the oxidation catalyst layer 19 as the counter electrode, the entire reaction efficiency is low. Meanwhile, in the photochemical reactor according to the present embodiment, the ion moving path through which $H^+$ or $OH^-$ moves is formed, whereby transportation of $H^+$ or $OH^-$ is improved to achieve a high photoreaction efficiency.

3. Photochemical Reactor

Hereinafter, a photochemical reactor using a photochemical reaction cell according to the present embodiment will be described using FIGS. 8 to 12.

Figure 8:
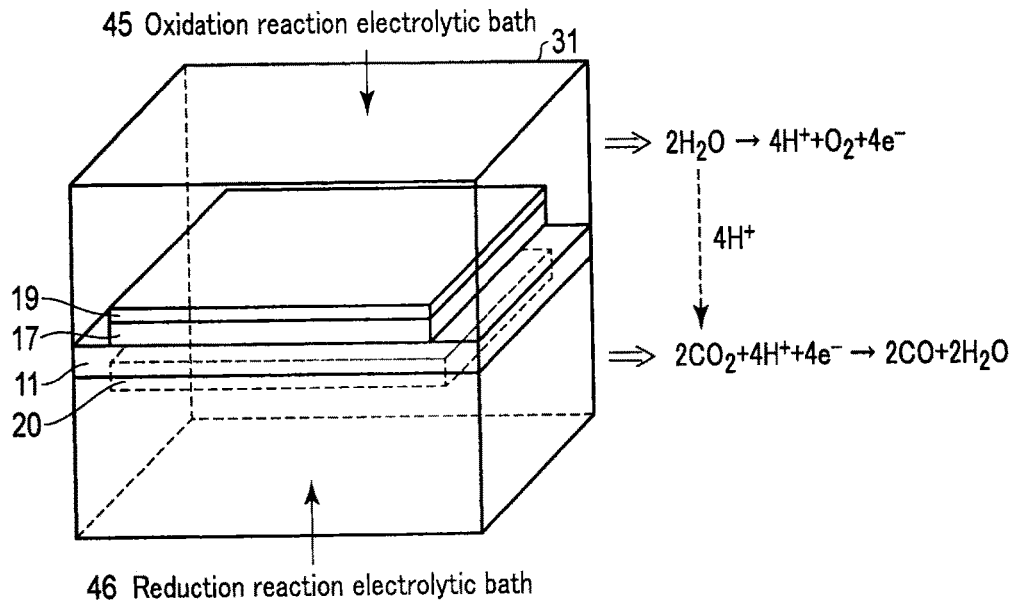
FIG. 8 is a perspective view showing a configuration of a photochemical reactor according to the embodiment.
Figure 9:
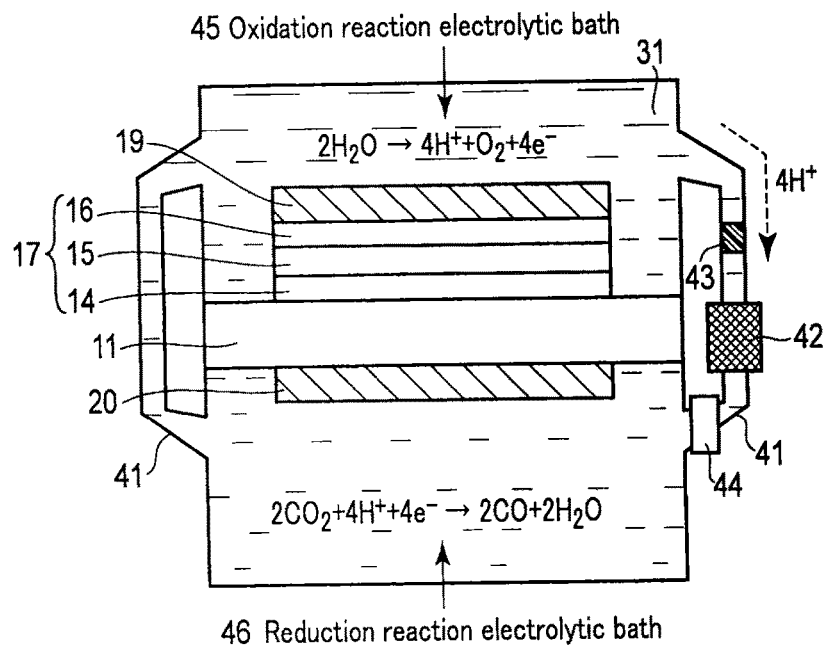
FIG. 9 is a cross-sectional view showing the configuration of the photochemical reactor according to the embodiment.

FIG. 8 is a perspective view showing a structure of the photochemical reactor according to the present embodiment. FIG. 9 is a cross-sectional view showing the structure of the photochemical reactor according to the embodiment. In FIG. 8, the ion moving path to be described later is omitted. Here, an example of an oxidation reduction reaction in an acid solution in which the hydrogen ion concentration of an electrolytic solution is less than 7 (the formulae (1) and (2)) is shown. In a basic solution in which the hydrogen ion concentration of an electrolytic solution is more than 7, the oxidation reduction reaction occurs in the formulae (3) and (4).

The photochemical reactor according to this embodiment is provided with a photochemical reaction cell constituted of a laminate including the oxidation catalyst layer 19, the reduction catalyst layer 20, and the multi-junction solar cell 17 formed between them and the ion moving path through which ions are moved between the oxidation catalyst layer 19 and the reduction catalyst layer 20. According to this constitution, $H^+$ produced on the oxidation catalyst layer 19 side can be moved to the reduction catalyst layer 20 with high photoreaction efficiency, and carbon dioxide can be decomposed by this $H^+$ on the reduction catalyst layer 20 side.

As shown in FIGS. 8 and 9, the photochemical reactor according to the present embodiment is provided with a photochemical reaction cell, an electrolytic tank 31 including the photochemical reaction cell, and an electrolytic tank flow passage 41 serving as an ion moving path and connected to the electrolytic tank 31.

The photochemical reaction cell is formed into a flat-plate shape and separates the electrolytic tank 31 into two tanks by at least the substrate 11. Namely, the electrolytic tank 31 is provided with an oxidation reaction electrolytic tank 45 in which the oxidation catalyst layer 19 of the photochemical reaction cell is arranged and a reduction reaction electrolytic tank 46 in which the reduction catalyst layer 20 of the photochemical reaction cell is arranged. Different electrolytic solutions can be supplied into the oxidation reaction electrolytic tank 45 and the reduction reaction electrolytic tank 46.

The oxidation reaction electrolytic tank 45 is filled with, for example, a liquid containing $H_2O$ as an electrolytic solution. The oxidation catalyst layer 19 is immersed in this electrolytic solution. Although examples of such an electrolytic solution include an electrolytic solution containing an arbitrary electrolyte, it is preferable that an electrolytic solution promoting an oxidation reaction of $H_2O$ is used. In the oxidation reaction electrolytic tank 45, $H_2O$ is oxidized by the oxidation catalyst layer 19 to produce $O_2$ and $H^+$.

The reduction reaction electrolytic tank 46 is filled with, for example, a liquid containing $CO_2$ as an electrolytic solution. The reduction catalyst layer 20 is immersed in the electrolytic solution. In the reduction catalyst layer 20, the metal fine particle 107 and a substrate (charge collector 101) are connected through the organic molecular layer 106, and the quaternary nitrogen cation 111 promoting $CO_2$ reduction reaction is fixed onto the metal fine particle 107. The details of an electrolytic solution which has absorbed $CO_2$ filled in the reduction reaction electrolytic tank 46 will be described later. A reduction potential is applied to the metal fine particle 107. Thus, among electrolyte components, especially, ions containing $CO_2$ (for example, a hydrogen carbonate ion) or physically dissolved $CO_2$ are subjected to application of electrostatic attraction near a metal fine particle 107 and the quaternary nitrogen cation 111 fixed onto a surface of the metal fine particle 107. Consequently, $CO_2$, the metal fine particle 107, and the quaternary nitrogen cation 111 form an electrical double layer at an interface of a catalyst/electrolytic solution. At this interface, a $CO_2$ reduction reaction due to a charge-transfer reaction occurs. In the reduction reaction electrolytic tank 46, $CO_2$ is reduced by the reduction catalyst layer 20 to produce a carbon compound. In the metal fine particle 107 having the quaternary nitrogen cation 111, a reduction product is changed by an interaction between the quaternary nitrogen cation 111 and the metal fine particle 107 and $CO_2$. Specifically, $CO_2$ is converted into carbon monoxide (CO), formic acid (HCOOH), formaldehyde (HCHO), methanol ($CH_3OH$), acetic acid ($CH_3COOH$), acetaldehyde ($CH_3CHO$), and ethanol ($CH_3CH_2OH$). Further, as a side reaction, water ($H_2O$) is reduced, and hydrogen ($H_2$) may be produced.

It is preferable that an electrolytic solution in the reduction reaction electrolytic tank 46 has a $CO_2$ absorbent which reduces a reduction potential of $CO_2$, has high ion conductivity, and absorbs $CO_2$. Examples of such an electrolytic solution include an ionic liquid, which comprises a salt of a positive ion such as an imidazolium ion or a pyridinium ion and a negative ion such as $BF_4^-$ or $PF_6^-$ and is in a liquid state in a wide temperature range, and an aqueous solution of the ionic liquid. In addition, examples of the electrolytic solution include an amine solution such as ethanolamine, imidazole, or pyridine and an aqueous solution thereof. Any of a primary amine, a secondary amine, or a tertiary amine may be used. A primary amine may be a methylamine, ethylamine, propylamine, butylamine, pentylamine, hexylamine, or the like. A hydrocarbon of the amine may be substituted with an alcohol, halogen, or the like. Examples of an amine whose hydrocarbon has been substituted include methanolamine, ethanolamine, and chloromethylamine. An unsaturated bond may exist. The substitution of hydrocarbons applies to a secondary amine and a tertiary amine as well. Examples of a secondary amine include a dimethylamine, diethylamine, dipropylamine, dipentylamine, dihexylamine, dimethanolamine, diethanolamine, and dipropanolamine. Substituted hydrocarbons may be different. This also applies to a tertiary amine. Examples of amines with different hydrocarbons include methylethylamine and methylpropylamine. A tertiary amine may be a trimethylamine, triethylamine, tripropylamine, tributylamine, trihexylamine, trimethanolamine, triethanolamine, tripropanolamine, tributanolamine, tripropanolamine, trihexanolamine, methyldiethylamine, or methyldipropylamine. A cation in an ionic liquid may be a 1-ethyl-3-methylimidazolium ion, 1-methyl-3-propylimidazolium ion, 1-butyl-3-methylimidazole ion, 1-methyl-3-pentylimidazolium ion, 1-hexyl-3-methylimidazolium ion, or the like. Position 2 of an imidazolium ion may be substituted. For example, such an imidazolium ion may be a 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, 1-hexyl-2,3-dimethylimidazolium ion, or the like. A pyridinium ion may be methylpyridinium, ethylpyridinium, propylpyridinium, butylpyridinium, pentylpyridinium, hexylpyridinium, or the like. For both imidazolium ion and pyridinium ion, an alkyl group may be substituted and an unsaturated bond may exist. As an anion, there are a fluoride ion, chloride ion, bromide ion, iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and the like. A dipolar ion made by binding a cation and an anion in an ionic liquid with a hydrocarbon may be used as well.

In the metal fine particle 107 having the quaternary nitrogen cation 111, the reduction reaction advances by an interaction between the quaternary nitrogen cation 111 and the metal fine particle 107 and carbon dioxide. If a two-electron reduction reaction of carbon dioxide occurs, formic acid is produced in addition to carbon monoxide. When a two-electron reduction reaction of formic acid occurs, formaldehyde is produced. Further, when a two-electron reduction reaction of formaldehyde occurs, methanol is produced. When methanol is produced by the metal fine particle 107 having the quaternary nitrogen cation 111, formic acid or formaldehyde may be selected as a reactant in addition to carbon dioxide. Thus, it is preferable that an electrolytic solution in the reduction reaction electrolytic tank 46 has absorbed at least one reactant selected from the group consisting of carbon dioxide, formic acid, and formaldehyde. Examples of the electrolytic solution in the reduction reaction electrolytic tank 46 include a sodium hydrogen carbonate solution.

When an eight-electron reduction reaction of carbon dioxide occurs, acetic acid may be produced. When an eight-electron reduction reaction of acetic acid occurs, acetaldehyde may be produced. Further, when an eight-electron reduction reaction of acetaldehyde occurs, ethanol is produced. When ethanol is produced by the metal fine particle 107 having the quaternary nitrogen cation 111, acetic acid or acetaldehyde may be selected as a reactant in addition to carbon dioxide. Thus, the electrolytic solution in the reduction reaction electrolytic tank 46 may have absorbed at least one reactant selected from carbon dioxide, acetic acid, and acetaldehyde.

The above-described reaction in which carbon dioxide is reduced to produce formic acid, formaldehyde, and methanol and the reaction in which carbon dioxide is reduced to produce acetic acid, acetaldehyde, and ethanol depend on the density of the modified organic molecule 112. Although the details will be described later in the Examples, for example, when the density of the modified organic molecule 112 is not more than $1 \times 10^{11}$ atoms/cm$^2$, the reaction in which formic acid, formaldehyde, and methanol are mainly produced occurs. Meanwhile, for example, when the density of the modified organic molecule 112 is not more than $1 \times 10^{12}$ to $10^{15}$ atoms/cm$^2$, the reaction in which acetic acid, acetaldehyde, and ethanol are produced in addition to formic acid, formaldehyde, and methanol occurs. In particular, when the density of the modified organic molecule 112 is $1 \times 10^{13}$ to $10^{15}$ atoms/cm$^2$, the reaction in which acetic acid, acetaldehyde, and ethanol are mainly produced occurs. The relationships between the molecular density of an organic molecule and products have been found as a result of experimental studies made by the present inventors, as shown in the Examples to be described later.

The temperatures of the electrolytic solutions filled in the oxidation reaction electrolytic tank 45 and the reduction reaction electrolytic tank 46 may be the same or different according to the use environment. For example, if the electrolytic solution used in the reduction reaction electrolytic tank 46 is an amine absorption solution containing $CO_2$ discharged from a factory, the temperature of the electrolytic solution is higher than the ambient temperature. In this case, the temperature of the electrolytic solution is not less than 30° C. and not more than 150° C. and more preferably not less than 40° C. and not more than 120° C.

The electrolytic tank flow passages 41 are provided lateral to the electrolytic tank 31, for example. One of the electrolytic tank flow passage 41 is connected to the oxidation reaction electrolytic tank 45, and the other is connected to the reduction reaction electrolytic tank 46. Namely, the electrolytic tank flow passage 41 connects the oxidation reaction electrolytic tank 45 and the reduction reaction electrolytic tank 46.

An ion exchange membrane 43 is filled in a portion of the electrolytic tank flow passage 41 and allows only a specific ion to pass through the electrolytic tank flow passage 41. According to this constitution, only the specific ion can be moved through the electrolytic tank flow passage 41 provided with the ion exchange membrane 43 while an electrolytic solution is separated between the oxidation reaction electrolytic tank 45 and the reduction reaction electrolytic tank 46. Namely, the photochemical reactor has a bulkhead structure that allows materials to pass selectively. Here, the ion exchange membrane 43 is a proton exchange membrane and can move H$^+$ produced in the oxidation reaction electrolytic tank 45 toward the reduction reaction electrolytic tank 46. More specifically, examples of the ion exchange membrane 43 include a cation exchange membrane such as nafion and fremion and an anion exchange membrane such as neoceptor and selemion.

Instead of the ion exchange membrane 43, an agar such as a salt bridge or the like, through which ions can move and which separates an electrolytic solution may be used. In general, if a proton exchangeable solid polymer membrane typified by nafion is used, the ion moving performance is good.

A circulation mechanism 42 such as a pump may be provided in the electrolytic tank flow passage 41. In this case, circulation of ions ($H^+$) can be improved between the oxidation reaction electrolytic tank 45 and the reduction reaction electrolytic tank 46. Two electrolytic tank flow passages 41 may be provided, and by virtue of the use of the circulation mechanism 42 provided in one of the electrolytic tank flow passages 41, ions are moved from the oxidation reaction electrolytic tank 45 to the reduction reaction electrolytic tank 46 through one of the electrolytic tank flow passages 41, and ions may be moved from the reduction reaction electrolytic tank 46 to the oxidation reaction electrolytic tank 45 through the other electrolytic tank flow passage 41. Further, a plurality of the circulation mechanisms 42 may be provided. Further, a plurality of (not less than three) the electrolytic tank flow passage 41 may be provided to reduce diffusion of ions and circulate ions more efficiently. Furthermore, a liquid is transported, whereby gas bubbles generated do not stay on an electrode surface and an electrolyte layer surface, and efficiency degradation and light quantity distribution caused by scattering of sunlight due to bubbles may be reduced.

Further, a temperature difference is caused to occur in an electrolytic solution using heat that moves upward by application of light to the surface of the multi-junction solar cell 17, so that diffusion of ions is reduced, and the ions may be circulated more efficiently. In other words, movement of ions can be promoted by convection other than ion diffusion.

Meanwhile, a temperature adjusting mechanism 44 which adjusts a temperature of an electrolytic solution is provided in the electrolytic tank flow passage 41 or the electrolytic tank 31, and a solar cell performance and a catalyst performance can be controlled by temperature control. Consequently, for example, in order to stabilize and enhance the solar cell performance and the catalyst performance, a temperature of a reaction system can be uniformized. Further, for system stabilization, a temperature increase can be prevented. selectivity of a solar cell and a catalyst can be changed by the temperature control, and its product can be controlled.

In this example, although an end of the substrate 11 protrudes more than ends of the multi-junction solar cell 17, the oxidation catalyst layer 19, and the reduction catalyst layer 20, this invention is not limited to this configuration. The substrate 11, the multi-junction solar cell 17, the oxidation catalyst layer 19, and the reduction catalyst layer 20 may have flat plate shapes having the same area.

Next, a variation of the photochemical reactor according to the present embodiment will be described.

Figure 10:
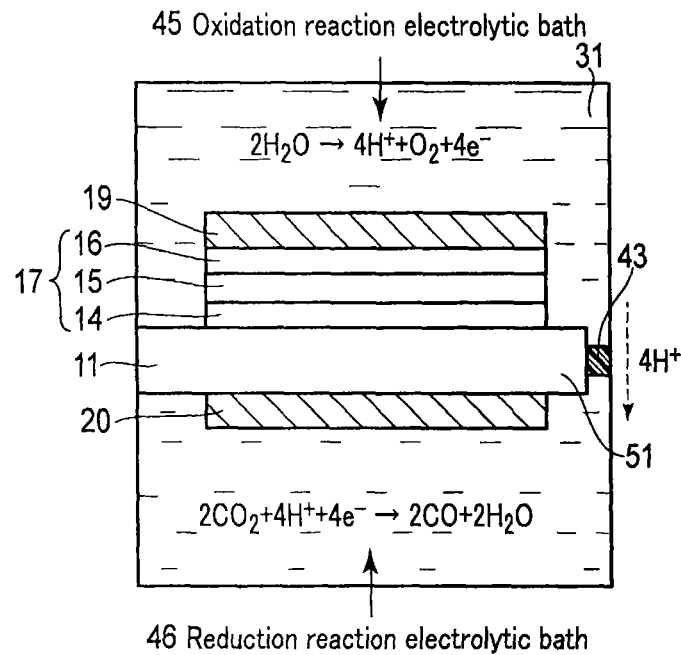
FIG. 10 is a cross-sectional view showing a configuration of a variation 1 of the photochemical reactor according to the embodiment.
Figure 11:
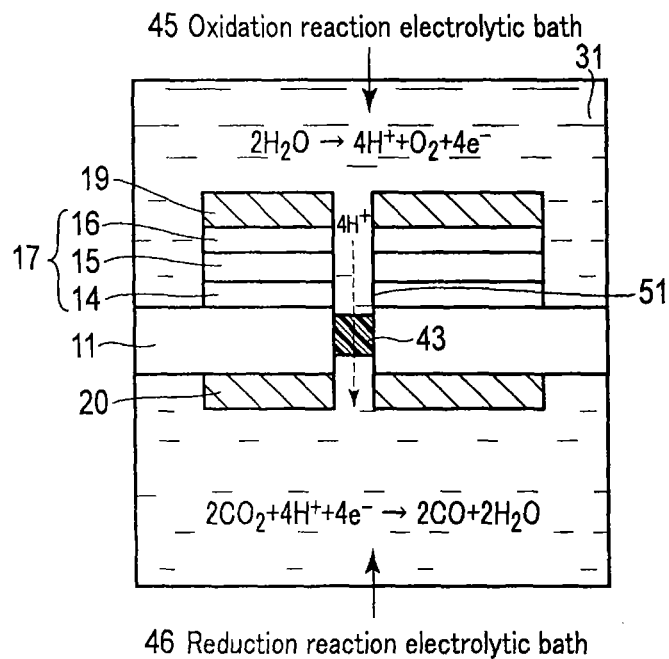
FIG. 11 is a cross-sectional view showing a configuration of a variation 2 of the photochemical reactor according to the embodiment.

FIGS. 10 and 11 are cross-sectional views showing structures of variations 1 and 2 in the photochemical reactor according to the present embodiment. In the variations of the photochemical reactor according to this embodiment, points different from the above structure will be mainly described.

As shown in FIG. 10, the variation 1 of the photochemical reactor according to the present embodiment is provided with a photochemical reaction cell, an electrolytic tank 31 including the photochemical reaction cell, and an opening 51 serving as an ion moving path and formed in the substrate 11.

The opening 51 is provided at an end of the substrate 11 so as to penetrate from an oxidation reaction electrolytic tank 45 to a reduction reaction electrolytic tank 46. According to this constitution, the opening 51 connects the oxidation reaction electrolytic tank 45 and the reduction reaction electrolytic tank 46.

An ion exchange membrane 43 is filled in a portion of the opening 51 and allows only a specific ion to pass. According to this constitution, only the specific ion can be moved through the opening 51 provided with the ion exchange membrane 43 while an electrolytic solution is separated between the oxidation reaction electrolytic tank 45 and the reduction reaction electrolytic tank 46.

In FIG. 11, the variation 2 in the photochemical reactor according to the present embodiment is provided with the photochemical reaction cell, the electrolytic tank 31, the multi-junction solar cell 17, the oxidation catalyst layer 19, the reduction catalyst layer 20, and the opening 51 formed as an ion moving path in the substrate 11.

The opening 51 is provided so as to penetrate through, for example, the substrate 11, the multi-junction solar cell 17, the oxidation catalyst layer 19, and the reduction catalyst layer 20 from the oxidation reaction electrolytic tank 45 to the reduction reaction electrolytic tank 46. According to this constitution, the opening 51 connects the oxidation reaction electrolytic tank 45 and the reduction reaction electrolytic tank 46.

The ion exchange membrane 43 is filled in a portion of the opening 51 and allows only a specific ion to pass. According to this constitution, only the specific ion can be moved through the opening 51 provided with the ion exchange membrane 43 while an electrolytic solution is separated between the oxidation reaction electrolytic tank 45 and the reduction reaction electrolytic tank 46.

In FIG. 11, although the ion exchange membrane 43 is formed in a portion of the opening 51, the ion exchange membrane 43 may be formed embedded inside the opening 51.

FIG. 12 is a view showing a photochemical reactor 200 and an electrolytic apparatus 300 according to the present embodiment. In the electrolytic apparatus 300, only a reduction catalyst layer 20a is shown, and other constituents are omitted.

As shown in FIG. 12, when carbon dioxide is reduced to produce a hydrocarbon compound, such as methanol, using the photochemical reactor 200 according to the present embodiment, a part of a reduction reaction from carbon dioxide to methanol may be carried out by another juxtaposed electrolytic apparatus 300. The electrolytic apparatus 300 has a known configuration and is provided with, for example, a metal catalyst, an organic metal complex catalyst, or a boron-doped diamond catalyst as the reduction catalyst layer 20a.

The reduction catalyst layer 20 in the photochemical reactor 200 according to the present embodiment can apply carbon dioxide to multi-electron reduction. Thus, in the photochemical reactor 200, formic acid and formaldehyde produced by reducing carbon dioxide are sequentially reduced to produce methanol. Meanwhile, as well as a usual type of the electrolytic apparatus 300, as an apparatus which reduces carbon dioxide to produce formic acid or an apparatus which reduces the obtained formic acid to produce formaldehyde, known apparatuses may be used. However, in the electrolytic apparatus 300, it is difficult to further reduce formaldehyde to produce methanol.

Thus, methanol is produced by reducing formic acid and formaldehyde, produced using the electrolytic apparatus 300, using the photochemical reactor 200 according to the present embodiment. Namely, the reduction reaction in the photochemical reactor 200 is a reduction reaction from formic acid and formaldehyde to methanol. Consequently, the generation efficiency of methanol in the photochemical reactor 200 is improved compared to a case of reducing carbon dioxide to produce methanol.

In the electrolytic apparatus 300, as the reduction catalyst 20a reducing carbon dioxide to produce formic acid, there are exemplified metal catalysts such as Sn, In, and Bi and organic metal complex catalysts such as Ru. As the catalyst 20a reducing formic acid to produce formaldehyde, there are exemplified a boron-doped diamond catalyst.

A catalyst reducing carbon dioxide to produce formic acid and formaldehyde is not limited, and known techniques are used. A power source and the configuration of the electrolytic apparatus 300 which reduce carbon dioxide to produce formic acid and formaldehyde are not limited.

When formic acid produced using the known electrolytic apparatus 300 is used as a raw material, formaldehyde and methanol are produced from formic acid using the photochemical reactor 200 according to the present embodiment. In this case, the reduction catalyst layer 20 according to this embodiment carries out a reduction reaction in a solution in which at least one reactant selected from carbon dioxide and formic acid is absorbed.

When formic acid and formaldehyde produced using the known electrolytic apparatus 300 are used as raw materials, methanol is produced from formic acid and formaldehyde using the photochemical reactor 200 according to the present embodiment. In this case, the reduction catalyst layer 20 according to this embodiment carries out a reduction reaction in a solution in which at least one reactant selected from carbon dioxide, formic acid, and formaldehyde is absorbed.

4. Examples of $CO_2$ Reduction Catalyst

Hereinafter, examples of the $CO_2$ reduction catalyst according to the present embodiment will be described using FIGS. 13 to 20.

FIG. 13 is a view showing Examples 1 to 11 of the $CO_2$ reduction catalyst according to the present embodiment, Comparative Example 1, and evaluation of the $CO_2$ reduction performances of them. FIG. 14 is a view showing Examples 12 to 17 of the $CO_2$ reduction catalyst according to this embodiment and evaluation of the $CO_2$ reduction performances of them. FIG. 15 is a view showing Examples 18 to 30 of the $CO_2$ reduction catalyst according to this embodiment, Comparative Examples 1 to 12, and evaluation of the $CO_2$ reduction performances of them. FIG. 16 is a view showing Examples 31 to 33 of the $CO_2$ reduction catalyst according to this embodiment, Comparative Examples 1, 13, and 14, and evaluation of the $CO_2$ reduction performances of them. FIG. 17 is a view showing Examples 34 to 39 of the $CO_2$ reduction catalyst according to the embodiment, Comparative Example 14, and evaluation of the $CO_2$ reduction performances of them. FIG. 18 is a view showing Example 40 of the $CO_2$ reduction catalyst according to this embodiment, Comparative Example 15, and evaluation of the $CO_2$ reduction performances of them. FIG. 19 is a view showing Examples 41 to 46 of the $CO_2$ reduction catalyst according to this embodiment and evaluation of the $CO_2$ reduction performances of them. FIG. 20 is a view showing Examples 47 to 52 of the $CO_2$ reduction catalyst according to this embodiment, Comparative Example 14, and evaluation of the $CO_2$ reduction performances of them.

More specifically, FIGS. 13 to 17 show an electrode potential and a product selectivity (Faraday efficiency) of a working electrode when constant-current electrolysis is conducted in the $CO_2$ reduction catalyst in each of Examples 1 to 39 and Comparative Examples 1 to 14. FIG. 18 shows an energy conversion efficiency when the $CO_2$ reduction catalyst in each of Example 40 and Comparative Example 15 is applied to a photochemical reactor. FIG. 19 shows a modified molecular density (in these examples, a molecular density of an organic molecular layer 106) and the product selectivity in the $CO_2$ reduction catalyst in each of Examples 41 to 52 and Comparative Example 14.

In the following examples, descriptions of similar points will be omitted as appropriate, and different points will be mainly described.

First, Examples 1 to 11 and Comparative Example 1 will be described using FIG. 13.

EXAMPLE 1

As shown in FIG. 13, the $CO_2$ reduction catalyst in Example 1 is an example in which a base material surface (surface layer 102) is Au, the organic molecular layer 106 is 10-carboxy-1-decanethiol, metal fine particles 107 are Au particles having an average particle diameter of 20 nm, and a modified organic molecule 112 is 11-mercaptoundecane-1-trimethylammoniumchloride.

(Production of $CO_2$ Reduction Catalyst)

First, the surface layer 102 is formed on a charge collector 101, constituted of a stainless substrate (150 mm×250 mm, thickness: 150 μm), by sputtering. The surface layer 102 has a uniform film thickness in a surface direction, and the film thickness is 100 nm. The surface layer 102 is a metal layer formed of Au.

Next, the organic molecular layer 106 is formed on a surface of the surface layer 102. The organic molecular layer 106 is formed by immersing the surface layer 102 in a 10-carboxy-1-decanethiol solution (ethanol solution of 1 mM) of 10 mL for 48 hours.

The formation of the organic molecular layer 106 is confirmed by measuring and comparing an electrochemical response of a substrate before and after a process of forming the organic molecular layer 106. More specifically, a three-electrode type cell in which a substrate formed with Au is a working electrode, a reference electrode is an Ag/AgCl electrode, and a counter electrode is a Pt electrode is formed. Then, a response of an oxidation-reduction current of a hexacyanoferrate (III) anion is observed in a 0.2 M potassium chloride (KCl) aqueous solution dissolved with potassium hexacyanoferrate (III) ($K_3[Fe(CN)_6]$) of 1 mM when a potential range is −0.1 to +0.5 V with respect to the Ag/AgCl electrode and a scanning speed is 100 mV/sec. Although an inversible oxidation-reduction current of a redox species is observed before the formation of the organic molecular layer 106, the oxidation-reduction current is not observed before the formation of the organic molecular layer 106. Disappearance of an electrochemical oxidation-reduction reaction of the hexacyanoferrate (III) anion is considered to be due to a shielding effect based on the formation of the organic molecular layer 106.

Then, the metal fine particles 107 constituted of Au are fixed onto a surface of the organic molecular layer 106. The metal fine particles 107 are fixed by immersing the substrate formed with the organic molecular layer 106 in an aqueous solution dispersed with the metal fine particles 107 for 12 hours. The metal fine particles 107 are Au nanoparticles whose average particle diameter evaluated using a particle size distribution meter (Zetasizer Nano ZS manufactured by Malvern Instruments Ltd) is 20 nm.

The fixing of the metal fine particles 107 is confirmed by measuring and comparing an electrochemical response of a substrate before and after a process of fixing the metal fine particles 107. More specifically, a three-electrode type cell in which a substrate formed with the organic molecular layer 106 is a working electrode, a reference electrode is an Ag/AgCl electrode, and a counter electrode is a Pt electrode is formed. Then, a response of an oxidation-reduction current of hexacyanoferrate (III) anion is observed in a 0.2 M potassium chloride (KCl) aqueous solution dissolved with potassium hexacyanoferrate (III) ($K_3[Fe(CN)_6]$) of 1 mM when the potential range is −0.1 to +0.5 V with respect to the Ag/AgCl electrode and the scanning speed is 100 mV/sec. Although an inversible oxidation-reduction current of a redox species is not observed due to the shielding effect according to the organic molecular layer 106 before the fixing of the metal fine particles 107, the oxidation-reduction current is observed again after the fixing of the metal fine particles 107. The fixing of the metal fine particles 107 onto the surface of the organic molecular layer 106 can be confirmed by observation of the electrochemical oxidation-reduction reaction of the hexacyanoferrate (III) anion.

Next, the modified organic molecule 112 is formed on the surface of the metal fine particle 107. The modified organic molecule 112 is formed by immersing the substrate formed with the metal fine particle 107 in an 11-mercaptoundecane-1-trimethylammoniumchloride solution (ethanol solution of 1 mM) of 10 mL for 48 hours.

The formation of the modified organic molecule 112 is confirmed by measuring and comparing an electrochemical response of a substrate before and after a process of forming the modified organic molecule 112 on the metal fine particle 107. More specifically, a three-electrode type cell in which a substrate fixed with the metal fine particle 107 is a working electrode, a reference electrode is an Ag/AgCl electrode, and a counter electrode is a Pt electrode is formed. Then, a response of an oxidation-reduction current of hexaammineruthenium (III) anion is observed in a 0.2 M potassium chloride (KCl) aqueous solution dissolved with hexaammineruthenium (III) chloride ($[Ru(NH_3)_6]Cl_3$) of 1 mM when the potential range is −0.5 to +0.1 V with respect to the Ag/AgCl electrode and the scanning speed is 100 mV/sec. Although an inversible oxidation-reduction current of a redox species is observed before the formation of the modified organic molecule 112, the oxidation-reduction reaction is not observed after the formation of the modified organic molecule 112. Disappearance of an electrochemical oxidation-reduction reaction of the hexaammineruthenium (III) cation is considered to be due to the shielding effect based on the formation of the modified organic molecule 112.

After that, in order to increase the amount of the metal fine particles 107, the process of fixing the metal fine particle 107 and forming the modified organic molecule 112 is repeated 10 times.

(Measurement of $CO_2$ Reduction Performance)

The $CO_2$ reduction performance of the $CO_2$ reduction catalyst ($CO_2$ reduction electrode) in Example 1 was evaluated by electrochemical measurement as follows.

A triethanolamine aqueous solution (50 wt % aqueous solution) was selected as a $CO_2$ absorbent and an electrolytic solution for $CO_2$ reduction. A 100% $CO_2$ gas was bubbled through the triethanolamine aqueous solution, and $CO_2$ was dissolved until the concentration of $CO_2$ absorbed in the solution reached saturation. When inlet and outlet concentrations of the $CO_2$ gas absorbed in the triethanolamine aqueous solution are measured and the inlet and outlet concentrations reach the same concentration, it is judged that the concentration reaches saturation.

The reduction performance of the $CO_2$ reduction catalyst was evaluated by an electrochemical measuring device (Solartron•Cell Test System manufactured by TOYO Corporation). The $CO_2$ reduction electrode was evaluated using an H-type cell, and a three-electrode type cell in which the $CO_2$ reduction electrode is a working electrode, a reference electrode is an Ag/AgCl electrode, and a counter electrode is a Pt electrode is formed. The Pt electrode is arranged in a cell partitioned by a glass filter.

In this electrochemical measuring device, an electrode potential (voltage) of a working electrode with respect to a reference electrode was measured when constant-current electrolysis was conducted so that a current flowing through a working electrode and a counter electrode was 1 mA/cm². Since a potential changes immediately after start of electrolysis, a value after 30 minutes when the potential was stabilized was adopted. Further, a reduction product produced at that time was analyzed. A gas component (hydrogen gas and carbon monoxide gas) was analyzed by gas chromatography (Varian Micro GC CP4900). Further, formic acid, formaldehyde, and methanol as reduced products dissolved in an electrolytic solution were analyzed. Formic acid was analyzed by ion chromatography (manufactured by Thermo Fisher Scientific K.K. (DX-320)), formaldehyde was analyzed by high-performance liquid chromatography (manufactured by Waters (ACQUITY UPLC))), and methanol was analyzed by gas chromatograph/mass spectrometry analysis (manufactured by Agilent Technologies (6890/5975)). The Faraday efficiency (product selectivity) was obtained from a current consumed by reduction reaction in the working electrode and quantitative analysis of a produced reduction product.

EXAMPLE 2

A $CO_2$ reduction catalyst in Example 2 is an example in which a base material surface (surface layer 102) is Au, an organic molecular layer 106 is 11-amino-1-undecanethiol, metal fine particles 107 are Au particles having an average particle diameter of 20 nm, and a modified organic molecule 112 is 1-(6-mercaptohexyl)-3-methylimidazolium bromide. Namely, the organic molecular layer 106 and the modified organic molecule 112 were changed with respect to the $CO_2$ reduction catalyst in Example 1. As in Example 1, the $CO_2$ reduction performance of the $CO_2$ reduction catalyst in Example 2 was evaluated by electrochemical measurement.

EXAMPLE 3

A $CO_2$ reduction catalyst in Example 3 is an example in which a base material surface (surface layer 102) is Au, an organic molecular layer 106 is 1,6-hexane dithiol, metal fine particles 107 are Au particles having an average particle diameter of 20 nm, and a modified organic molecule 112 is 1-(8-mercaptooctyl)-4-methylpyridinium bromide. Namely, the organic molecular layer 106 and the modified organic molecule 112 were changed with respect to the $CO_2$ reduction catalyst in Example 1. As in Example 1, the $CO_2$ reduction performance of the $CO_2$ reduction catalyst in Example 3 was evaluated by electrochemical measurement.

EXAMPLE 4

A $CO_2$ reduction catalyst in Example 4 is an example in which a base material surface (surface layer 102) is Au, an organic molecular layer 106 is 1-(6-mercaptohexyl)-4-methylpyridinium bromide, metal fine particles 107 are Au particles having an average particle diameter of 20 nm, and a modified organic molecule 112 is 1-(8-mercaptooctyl)-1-methylpiperidinium bromide. Namely, the organic molecular layer 106 and the modified organic molecule 112 were changed with respect to the $CO_2$ reduction catalyst in Example 1. As in Example 1, the $CO_2$ reduction performance of the $CO_2$ reduction catalyst in Example 4 was evaluated by electrochemical measurement.

EXAMPLE 5

A $CO_2$ reduction catalyst in Example 5 is an example in which a base material surface (surface layer 102) is Au, an organic molecular layer 106 is 1-(12-mercaptododecyl)-3-methylimidazolium bromide, metal fine particles 107 are Au particles having an average particle diameter of 20 nm, and a modified organic molecule 112 is 1-(10-mercaptodecyl)-1-methylpyrrolidinium. Namely, the organic molecular layer 106 and the modified organic molecule 112 were changed with respect to the $CO_2$ reduction catalyst in Example 1. As in Example 1, the $CO_2$ reduction performance of the $CO_2$ reduction catalyst in Example 4 was evaluated by electrochemical measurement.

EXAMPLE 6

A $CO_2$ reduction catalyst in Example 6 is an example in which a base material surface (surface layer 102) is Au, an organic molecular layer 106 is 1-(6-mercaptohexyl)-4-methylpyridinium bromide, metal fine particles 107 are Au particles having an average particle diameter of 20 nm, and a modified organic molecule 112 is 1-(6-mercaptohexyl)-4-methylpyridinium bromide. Namely, the organic molecular layer 106 and the modified organic molecule 112 were changed with respect to the $CO_2$ reduction catalyst in Example 1. As in Example 1, the $CO_2$ reduction performance of the $CO_2$ reduction catalyst in Example 6 was evaluated by electrochemical measurement.

EXAMPLE 7

In a $CO_2$ reduction catalyst in Example 7, a base material surface (surface layer 102) is Au, an organic molecular layer 106 is 1-(6-mercaptohexyl)-4-methylpyridinium bromide, metal fine particles 107 are Au particles having an average particle diameter of 20 nm, and a modified organic molecule 112 is not formed.

(Production of $CO_2$ Reduction Catalyst)

First, the surface layer 102 is formed on a charge collector 101, constituted of a stainless substrate (150 mm×250 mm, thickness: 150 µm), by sputtering. The surface layer 102 has a uniform film thickness in a surface direction, and the film thickness is 100 nm. The surface layer 102 is a metal layer formed of Au.

Next, the organic molecular layer 106 is formed on a surface of the surface layer 102. The organic molecular layer 106 is formed by immersing the surface layer 102 in a 1-(6-mercaptohexyl)-4-methylpyridinium bromide solution (ethanol solution of 1 mM) of 10 mL for 48 hours.

Then, the metal fine particles 107 constituted of Au are fixed onto a surface of the organic molecular layer 106. The metal fine particles 107 are fixed by immersing a substrate formed with the organic molecular layer 106 in an aqueous solution dispersed with the metal fine particles 107 for 12 hours.

(Measurement of $CO_2$ Reduction Performance)

As in Example 1, the $CO_2$ reduction performance of the $CO_2$ reduction catalyst in Example 7 was evaluated by electrochemical measurement.

EXAMPLE 8

A $CO_2$ reduction catalyst in Example 8 is an example in which a base material surface (surface layer 102) is Au, a modified organic molecule 112 is 1-(6-mercaptohexyl)-4-methylpyridinium bromide, and an organic molecular layer 106 and a metal fine particle 107 are not formed.

(Production of $CO_2$ Reduction Catalyst)

First, the surface layer 102 is formed on a charge collector 101, constituted of a stainless substrate (150 mm×250 mm, thickness: 150 µm), by sputtering. The surface layer 102 has a uniform film thickness in a surface direction, and the film thickness is 100 nm. The surface layer 102 is a metal layer formed of Au.

Next, the modified organic particle 107 is formed on a surface of the surface layer 102. The modified organic particle 107 is formed by immersing the surface layer 102 in a 1-(6-mercaptohexyl)-4-methylpyridinium bromide solution (ethanol solution of 1 mM) of 10 mL for 48 hours.

(Measurement of $CO_2$ Reduction Performance)

As in Example 1, the $CO_2$ reduction performance of the $CO_2$ reduction catalyst in Example 8 was evaluated by electrochemical measurement.

EXAMPLE 9

A $CO_2$ reduction catalyst in Example 9 is an example in which a base material surface (surface layer 102) is $TiO_2$, an organic molecular layer 106 is 11-mercaptoundecane-1-phosphonic acid, metal fine particles 107 are Au particles having an average particle diameter of 20 nm, and a modified organic molecule 112 is 1-(8-mercaptooctyl)-3-methylimidazolium bromide. Namely, the surface layer 102, the organic molecular layer 106, and the modified organic molecule 112 were changed with respect to the $CO_2$ reduction catalyst in Example 1. The surface layer 102 was formed by an ALD method, and the film thickness was 1 nm. As in Example 1, the $CO_2$ reduction performance of the $CO_2$ reduction catalyst in Example 9 was evaluated by electrochemical measurement.

EXAMPLE 10

A $CO_2$ reduction catalyst in Example 10, a base material surface (surface layer 102) is $ZrO_2$, an organic molecular layer 106 is 11-mercaptoundecane-1-phosphonic acid, metal fine particles 107 are Au particles having an average particle diameter of 20 nm, and a modified organic molecule 112 is 1-(8-mercaptooctyl)-3-methylimidazolium bromide. Namely, the surface layer 102, the organic molecular layer 106, and the modified organic molecule 112 were changed with respect to the $CO_2$ reduction catalyst in Example 1. The surface layer 102 was formed by the ALD method, and the film thickness was 1 nm. As in Example 1, the $CO_2$ reduction performance of the $CO_2$ reduction catalyst in Example 10 was evaluated by electrochemical measurement.

EXAMPLE 11

A $CO_2$ reduction catalyst in Example 11 is an example in which a base material surface (surface layer 102) is $Al_2O_3$, an organic molecular layer 106 is 11-mercaptoundecane-1-phosphonic acid, metal fine particles 107 are Au particles having an average particle diameter of 20 nm, and a modified organic molecule 112 is 1-(8-mercaptooctyl)-3-methylimidazolium bromide. Namely, the surface layer 102, the organic molecular layer 106, and the modified organic molecule 112 were changed with respect to the $CO_2$ reduction catalyst in Example 1. The surface layer 102 was formed by the ALD method, and the film thickness was 1 nm. As in Example 1, the $CO_2$ reduction performance of the $CO_2$ reduction catalyst in Example 11 was evaluated by electrochemical measurement.

COMPARATIVE EXAMPLE 1

A $CO_2$ reduction catalyst in Comparative Example 1 is an example in which a base material surface (surface layer 102) is Au, and an organic molecular layer 106, a metal fine particle 107, and a modified organic molecule 112 are not formed. As in Example 1, the $CO_2$ reduction performance of the $CO_2$ reduction catalyst in Comparative Example 1 was evaluated by electrochemical measurement.

[Evaluation of $CO_2$ Reduction Performances in Examples 1 to 11]

As shown in FIG. 13, in Examples 1 to 11, the surface layer 102, the organic molecular layer 106, and the modified organic molecule 112 were suitably changed without changing the average particle diameter of the metal fine particles 107.

In the $CO_2$ reduction catalysts in Examples 1 to 5, even if the organic molecular layer 106 and the modified organic molecule 112 are changed, the $CO_2$ reduction potential is low compared to the flat-plate shaped Au electrode shown in Comparative Example 1, and the product selectivity is high. This is considered to be because the metal fine particle 107 having a large reactive area advantageously acts on the $CO_2$ reduction reaction regardless of the materials of the organic molecular layer 106 and the modified organic molecule 112, and, in addition, the modified organic molecule 112 contributes to the enhancement of the $CO_2$ reduction activity. In other words, the modified organic molecule 112 can selectively make the $CO_2$ reduction reaction advance with low energy with respect to the $CO_2$ reduction reaction.

In the $CO_2$ reduction catalyst in Example 7, as compared to the flat-plate shaped Au electrode shown in Comparative Example 1, the $CO_2$ reduction potential is low, and the production selectivity is high. This is considered to be because, even if the modified organic molecule 112 is not provided, the metal fine particle 107 having a large reactive area advantageously acts on the $CO_2$ reduction reaction.

In the $CO_2$ reduction catalyst in Example 8, as compared to the flat-plate shaped Au electrode shown in Comparative Example 1, the $CO_2$ reduction potential is low, and the production selectivity is high. This is considered to be because, even if the organic molecular layer 106 and the metal fine particle 107 are not provided, the modified organic molecule 112 contributes to the enhancement of the $CO_2$ reduction activity.

In the $CO_2$ reduction catalysts in Examples 9 and 10, as compared to the flat-plate shaped Au electrode shown in Comparative Example 1, the $CO_2$ reduction potential is low, and the product selectivity is high. This is considered to be because, even if the surface layer 102 is an oxide layer, the metal fine particle 107 having a large reactive area advantageously acts on the $CO_2$ reduction reaction regardless of the material of the surface layer 102, and, in addition, the modified organic molecule 112 contributes to the enhancement of the $CO_2$ reduction activity. Namely, even if the surface layer 102 is an oxide layer, a $CO_2$ reduction catalyst having high $CO_2$ reduction performance can be provided.

Next, Examples 12 to 17 will be described using FIG. 14.

EXAMPLE 12

As shown in FIG. 14, the $CO_2$ reduction catalyst in Example 12 is an example in which a base material surface (surface layer 102) is Au, the organic molecular layer 106 is 1-(4-mercaptobutyl)-3-methylimidazolium bromide, metal fine particles 107 are Au particles having an average particle diameter of 0.5 nm, and a modified organic molecule 112 is 1-(4-mercaptobutyl)-3-methylimidazolium bromide. As in Example 1, the $CO_2$ reduction performance of the $CO_2$ reduction catalyst in Example 12 was evaluated by electrochemical measurement.

EXAMPLE 13

The $CO_2$ reduction catalyst in Example 13 is an example in which a base material surface (surface layer 102) is Au, an organic molecular layer 106 is 1-(4-mercaptobutyl)-3-methylimidazolium bromide, metal fine particles 107 are Au particles having an average particle diameter of 54 nm, and a modified organic molecule 112 is 1-(4-mercaptobutyl)-3-methylimidazolium bromide. As in Example 1, the $CO_2$ reduction performance of the $CO_2$ reduction catalyst in Example 13 was evaluated by electrochemical measurement.

EXAMPLE 14

The $CO_2$ reduction catalyst in Example 14 is an example in which a base material surface (surface layer 102) is Au, an organic molecular layer 106 is 1-(4-mercaptobutyl)-3-methylimidazolium bromide, metal fine particles 107 are Au particles having an average particle diameter of 105 nm, and a modified organic molecule 112 is 1-(4-mercaptobutyl)-3-methylimidazolium bromide. As in Example 1, the $CO_2$ reduction performance of the $CO_2$ reduction catalyst in Example 14 was evaluated by electrochemical measurement.

EXAMPLE 15

The $CO_2$ reduction catalyst in Example 15 is an example in which a base material surface (surface layer 102) is Au, an organic molecular layer 106 is 1-(4-mercaptobutyl)-3-methylimidazolium bromide, metal fine particles 107 are Au particles having an average particle diameter of 156 nm, and a modified organic molecule 112 is 1-(4-mercaptobutyl)-3-methylimidazolium bromide. As in Example 1, the $CO_2$ reduction performance of the $CO_2$ reduction catalyst in Example 15 was evaluated by electrochemical measurement.

EXAMPLE 16

The $CO_2$ reduction catalyst in Example 16 is an example in which a base material surface (surface layer 102) is Au, an organic molecular layer 106 is 1-(4-mercaptobutyl)-3-methylimidazolium bromide, metal fine particles 107 are Au particles having an average particle diameter of 300 nm, and a modified organic molecule 112 is 1-(4-mercaptobutyl)-3-methylimidazolium bromide. As in Example 1, the $CO_2$ reduction performance of the $CO_2$ reduction catalyst in Example 16 was evaluated by electrochemical measurement.

EXAMPLE 17

The $CO_2$ reduction catalyst in Example 17 is an example in which a base material surface (surface layer 102) is Au, an organic molecular layer 106 is 1-(4-mercaptobutyl)-3-methylimidazolium bromide, metal fine particles 107 are Au particles having an average particle diameter of 500 nm, and a modified organic molecule 112 is 1-(4-mercaptobutyl)-3-methylimidazolium bromide. As in Example 1, the $CO_2$ reduction performance of the $CO_2$ reduction catalyst in Example 17 was evaluated by electrochemical measurement.

[Evaluation of $CO_2$ Reduction Performances in Examples 12 to 17]

As shown in FIG. 14, in Examples 12 to 17, the average particle diameter of the metal fine particles 107 was suitably changed without changing the surface layer 102, the organic molecular layer 106, and the modified organic molecule 112.

In the $CO_2$ reduction catalysts in Examples 12 to 17, as compared to the flat-plate shaped Au electrode shown in Comparative Example 1, the $CO_2$ reduction potential is low, and the production selectivity is high. However, if the average particle diameter of the metal fine particles 107 is more than 300 nm (Examples 16 and 17), the product selectively is reduced. This is considered to be because, if the average particle diameter of the metal fine particles 107 is more than 300 nm, the active area (surface area of the metal fine particle) required for reaction is reduced.

Next, Examples 18 to 30 and Comparative Examples 1 to 12 will be described using FIG. 15.

EXAMPLE 18

As shown in FIG. 15, the $CO_2$ reduction catalyst in Example 18 is an example in which a base material surface (surface layer 102) is Au, an organic molecular layer 106 is 1,10-decane dithiol, metal fine particles 107 are Ag particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 18 was evaluated by electrochemical measurement.

EXAMPLE 19

The $CO_2$ reduction catalyst in Example 19 is an example in which a base material surface (surface layer 102) is Ag, an organic molecular layer 106 is 1,10-decane dithiol, metal fine particles 107 are Pt particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 19 was evaluated by electrochemical measurement.

EXAMPLE 20

The $CO_2$ reduction catalyst in Example 20 is an example in which a base material surface (surface layer 102) is Ag, an organic molecular layer 106 is 1,10-decane dithiol, metal fine particles 107 are Ag particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 20 was evaluated by electrochemical measurement.

EXAMPLE 21

The $CO_2$ reduction catalyst in Example 21 is an example in which a base material surface (surface layer 102) is Cu, an organic molecular layer 106 is 1,10-decane dithiol, metal fine particles 107 are Cu particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 21 was evaluated by electrochemical measurement.

EXAMPLE 22

The $CO_2$ reduction catalyst in Example 22 is an example in which a base material surface (surface layer 102) is Zn, an organic molecular layer 106 is 1,10-decane dithiol, metal fine particles 107 are Zn particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 22 was evaluated by electrochemical measurement.

EXAMPLE 23

The $CO_2$ reduction catalyst in Example 23 is an example in which a base material surface (surface layer 102) is Pt, an organic molecular layer 106 is 1,10-decane dithiol, metal fine particles 107 are Sn particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 23 was evaluated by electrochemical measurement.

EXAMPLE 24

The $CO_2$ reduction catalyst in Example 24 is an example in which a base material surface (surface layer 102) is Au, an organic molecular layer 106 is 1,10-decane dithiol, metal fine particles 107 are Pd particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 24 was evaluated by electrochemical measurement.

EXAMPLE 25

The $CO_2$ reduction catalyst in Example 25 is an example in which a base material surface (surface layer 102) is Fe, an organic molecular layer 106 is 1,10-decane dithiol, metal fine particles 107 are Al particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 25 was evaluated by electrochemical measurement.

EXAMPLE 26

The $CO_2$ reduction catalyst in Example 26 is an example in which a base material surface (surface layer 102) is Ti, an organic molecular layer 106 is 1,10-decane dithiol, metal fine particles 107 are Au particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 26 was evaluated by electrochemical measurement.

EXAMPLE 27

The $CO_2$ reduction catalyst in Example 27 is an example in which a base material surface (surface layer 102) is Ni, an organic molecular layer 106 is 1,10-decane dithiol, metal fine particles 107 are Au particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 27 was evaluated by electrochemical measurement.

EXAMPLE 28

The $CO_2$ reduction catalyst in Example 28 is an example in which a base material surface (surface layer 102) is Sn, an organic molecular layer 106 is 1,10-decane dithiol, metal fine particles 107 are Au particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example was evaluated by electrochemical measurement.

EXAMPLE 29

The $CO_2$ reduction catalyst in Example 29 is an example in which a base material surface (surface layer 102) is In, an organic molecular layer 106 is 1,10-decane dithiol, metal fine particles 107 are Au particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 29 was evaluated by electrochemical measurement.

EXAMPLE 30

The $CO_2$ reduction catalyst in Example 30 is an example in which a base material surface (surface layer 102) is Bi, an organic molecular layer 106 is 1,10-decane dithiol, metal fine particles 107 are Au particles having an average particle diameter of 15 nm, and a modified organic molecule 112 is 1-(6-mercaptohexyl)-4-methylpyridinium bromide. As in Example 1, the $CO_2$ reduction performance of the $CO_2$ reduction catalyst in Example 30 was evaluated by electrochemical measurement.

COMPARATIVE EXAMPLE 2

The $CO_2$ reduction catalyst in Comparative Example 2 is an example in which a base material surface (surface layer 102) is Pt, and an organic molecular layer 106, a metal fine particle 107, and a modified organic molecule 112 are not formed. As in Example 1, the $CO_2$ reduction performance of the $CO_2$ reduction catalyst in Comparative Example 2 was evaluated by electrochemical measurement.

COMPARATIVE EXAMPLE 3

The $CO_2$ reduction catalyst in Comparative Example 3 is an example in which a base material surface (surface layer 102) is Ag, and an organic molecular layer 106, a metal fine particle 107, and a modified organic molecule 112 are not formed. As in Example 1, the $CO_2$ reduction performance of the $CO_2$ reduction catalyst in Comparative Example 3 was evaluated by electrochemical measurement.

COMPARATIVE EXAMPLE 4

The $CO_2$ reduction catalyst in Comparative Example 4 is an example in which a base material surface (surface layer 102) is Cu, an organic molecular layer 106, a metal fine particle 107, and a modified organic molecule 112 are not formed. As in Example 1, the $CO_2$ reduction performance of the $CO_2$ reduction catalyst in Comparative Example 4 was evaluated by electrochemical measurement.

COMPARATIVE EXAMPLE 5

The $CO_2$ reduction catalyst in Comparative Example 5 is an example in which a base material surface (surface layer 102) is Zn, an organic molecular layer 106, a metal fine particle 107, and a modified organic molecule 112 are not formed. As in Example 1, the $CO_2$ reduction performance of the $CO_2$ reduction catalyst in Comparative Example 5 was evaluated by electrochemical measurement.

COMPARATIVE EXAMPLE 6

The $CO_2$ reduction catalyst in Comparative Example 6 is an example in which a base material surface (surface layer 102) is Pd, an organic molecular layer 106, a metal fine particle 107, and a modified organic molecule 112 are not formed. As in Example 1, the $CO_2$ reduction performance of the $CO_2$ reduction catalyst in Comparative Example 6 was evaluated by electrochemical measurement.

COMPARATIVE EXAMPLE 7

The $CO_2$ reduction catalyst in Comparative Example 7 is an example in which a base material surface (surface layer 102) is Fe, an organic molecular layer 106, a metal fine particle 107, and a modified organic molecule 112 are not formed. As in Example 1, the $CO_2$ reduction performance of the $CO_2$ reduction catalyst in Comparative Example 7 was evaluated by electrochemical measurement.

COMPARATIVE EXAMPLE 8

The $CO_2$ reduction catalyst in Comparative Example 8 is an example in which a base material surface (surface layer 102) is Ti, an organic molecular layer 106, a metal fine particle 107, and a modified organic molecule 112 are not formed. As in Example 1, the $CO_2$ reduction performance of the $CO_2$ reduction catalyst in Comparative Example 8 was evaluated by electrochemical measurement.

COMPARATIVE EXAMPLE 9

The $CO_2$ reduction catalyst in Comparative Example 9 is an example in which a base material surface (surface layer 102) is Ni, an organic molecular layer 106, a metal fine particle 107, and a modified organic molecule 112 are not formed. As in Example 1, the $CO_2$ reduction performance of the $CO_2$ reduction catalyst in Comparative Example 9 was evaluated by electrochemical measurement.

COMPARATIVE EXAMPLE 10

The $CO_2$ reduction catalyst in Comparative Example 10 is an example in which a base material surface (surface layer 102) is Sn, an organic molecular layer 106, a metal fine particle 107, and a modified organic molecule 112 are not formed. As in Example 1, the $CO_2$ reduction performance of the $CO_2$ reduction catalyst in Comparative Example 10 was evaluated by electrochemical measurement.

COMPARATIVE EXAMPLE 11

The $CO_2$ reduction catalyst in Comparative Example 11 is an example in which a base material surface (surface layer 102) is In, an organic molecular layer 106, a metal fine particle 107, and a modified organic molecule 112 are not formed. As in Example 1, the $CO_2$ reduction performance of the $CO_2$ reduction catalyst in Comparative Example 11 was evaluated by electrochemical measurement.

COMPARATIVE EXAMPLE 12

The $CO_2$ reduction catalyst in Comparative Example 12 is an example in which a base material surface (surface layer 102) is Bi, an organic molecular layer 106, a metal fine particle 107, and a modified organic molecule 112 are not formed. As in Example 1, the $CO_2$ reduction performance of the $CO_2$ reduction catalyst in Comparative Example 12 was evaluated by electrochemical measurement.

[Evaluation of $CO_2$ Reduction Performances in Examples 18 to 30]

As shown in FIG. 15, in each of Examples 18 to 30, the material of the surface layer 102 and the material of the metal fine particles 107 were suitably changed without changing the organic molecular layer 106, the modified organic molecule 112, and the average particle diameter of the metal fine particles 107.

In the $CO_2$ reduction catalysts in Examples 18 to 30, as compared to the flat-plate shaped Au, Pt, Ag, Cu, and Zn electrodes shown in Comparative Examples 1 to 12, the $CO_2$ reduction potential is low, and the production selectivity is high. Namely, even if the surface layers 102 and the metal fine particles 107 of various metals such as Au, Pt, Ag, Cu, and Zn are used as in Examples 18 to 30, a $CO_2$ reduction catalyst having high $CO_2$ reduction performance can be provided.

Next, Examples 31 to 33 and Comparative Examples 13 and 14 will be described using FIG. 16.

EXAMPLE 31

As shown in FIG. 16, a $CO_2$ reduction catalyst in Example 31 is an example in which a base material surface (surface layer 102) is Au, an organic molecular layer 106 is 1-(4-mercaptobutyl)-1-methylpyrrolidinium bromide, metal fine particles 107 are Au particles having an average particle diameter of 30 nm, and a modified organic molecule 112 is 1-(4-mercaptobutyl)-1-methylpyrrolidinium bromide.

As in Example 1, the $CO_2$ reduction performance of the $CO_2$ reduction catalyst in Example 31 was evaluated by electrochemical measurement. In Example 31, a triethanolamine aqueous solution (50 wt % aqueous solution, $CO_2$ saturated absorbing liquid) was selected as a $CO_2$ absorbent and an electrolytic solution for $CO_2$ reduction.

EXAMPLE 32

A $CO_2$ reduction catalyst in Example 32 is an example in which a base material surface (surface layer 102) is Au, an organic molecular layer 106 is 1-(4-mercaptobutyl)-1-methylpyrrolidinium bromide, metal fine particles 107 are Au particles having an average particle diameter of 30 nm, and a modified organic molecule 112 is 1-(4-mercaptobutyl)-1-methylpyrrolidinium bromide. As in Example 1, the $CO_2$ reduction performance of the $CO_2$ reduction catalyst in Example 32 was evaluated by electrochemical measurement. In Example 32, a 90% 1-ethyl-3-methylimidazolium tetrafluoroborate aqueous solution ($EMIBF_4$, $CO_2$ saturated absorbing liquid) was selected as a $CO_2$ absorbent and an electrolytic solution for $CO_2$ reduction.

EXAMPLE 33

A $CO_2$ reduction catalyst in Example 33 is an example in which a base material surface (surface layer 102) is Au, an organic molecular layer 106 is 1-(4-mercaptobutyl)-1-methylpyrrolidinium bromide, metal fine particles 107 are Au particles having an average particle diameter of 30 nm, and a modified organic molecule 112 is 1-(4-mercaptobutyl)-1-methylpyrrolidinium bromide. As in Example 1, the $CO_2$ reduction, performance of the $CO_2$ reduction catalyst in Example 33 was evaluated by electrochemical measurement. In Example 33, a 5% aqueous sodium hydrogencarbonate solution ($NaHCO_3$, $CO_2$ saturated absorbing liquid) was selected as a $CO_2$ absorbent and an electrolytic solution for $CO_2$ reduction.

COMPARATIVE EXAMPLE 13

A $CO_2$ reduction catalyst in Comparative Example 13 is an example in which a base material surface (surface layer 102) is Au, an organic molecular layer 106, a metal fine particle 107, and a modified organic molecule 112 are not formed. As in Example 1, the $CO_2$ reduction performance of the $CO_2$ reduction catalyst in Comparative Example 13 was evaluated by electrochemical measurement. In Comparative Example 13, a 90% 1-ethyl-3-methylimidazolium tetrafluoroborate aqueous solution ($EMIBF_4$, $CO_2$ saturated absorbing liquid) was selected as a $CO_2$ absorbent and an electrolytic solution for $CO_2$ reduction.

COMPARATIVE EXAMPLE 14

A $CO_2$ reduction catalyst in Comparative Example 14 is an example in which a base material surface (surface layer 102) is Au, an organic molecular layer 106, a metal fine particle 107, and a modified organic molecule 112 are not formed. As in Example 1, the $CO_2$ reduction performance of the $CO_2$ reduction catalyst in Comparative Example 14 was evaluated by electrochemical measurement. In Comparative Example 14, a 5% aqueous sodium hydrogencarbonate solution ($NaHCO_3$, $CO_2$ saturated absorbing liquid) was selected as a $CO_2$ absorbent and an electrolytic solution for $CO_2$ reduction.

[Evaluation of $CO_2$ Reduction Performances in Examples 31 to 33]

As shown in FIG. 14, in each of Examples 31 to 33, the electrolytic solutions for $CO_2$ reduction were suitably changed without changing the materials of the surface layer 102, the organic molecular layer 106, the modified organic molecule 112, and the metal fine particles 107.

In the $CO_2$ reduction catalysts in Examples 31 to 33, as compared to the flat-plate shaped Au electrode shown in Comparative Examples 1, 13, and 14, the $CO_2$ reduction potential is low, and the production selectivity is high. Namely, even if an amine aqueous solution, an ionic liquid aqueous solution, or sodium hydrogen carbonate is used as an electrolytic solution for $CO_2$ reduction as in Examples 31 to 33, a $CO_2$ reduction catalyst having high $CO_2$ reduction performance can be provided. In particular, when the ionic liquid aqueous solution was used (Example 32), the $CO_2$ reduction catalyst according to the present embodiment exhibited the highest $CO_2$ reduction performance.

Next, Examples 34 to 39 and Comparative Example 14 will be described using FIG. 17.

EXAMPLE 34

A $CO_2$ reduction catalyst in Example 34 is an example in which a base material surface (surface layer 102) is Au, an organic molecular layer 106 is 1-(2-mercaptoethyl)-3-methylimidazolium bromide, metal fine particles 107 are Au particles having an average particle diameter of 5 nm, and a modified organic molecule 112 is 1-(2-mercaptoethyl)-3-methylimidazolium bromide. As in Example 1, the $CO_2$ reduction performance of the $CO_2$ reduction catalyst in Example 34 was evaluated by electrochemical measurement. In Example 34, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

EXAMPLE 35

A $CO_2$ reduction catalyst in Example 35 is an example in which a base material surface (surface layer 102) is Au, an organic molecular layer 106 is 1-(6-mercaptoethyl)-3-methylimidazolium bromide, metal fine particles 107 are Au particles having an average particle diameter of 5 nm, and a modified organic molecule 112 is 1-(6-mercaptoethyl)-3-methylimidazolium bromide. As in Example 1, the $CO_2$ reduction performance of the $CO_2$ reduction catalyst in Example 35 was evaluated by electrochemical measurement. In Example 35, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

EXAMPLE 36

A $CO_2$ reduction catalyst in Example 36 is an example in which a base material surface (surface layer 102) is Au, an organic molecular layer 106 is 1-(12-mercaptododecyl)-3-methylimidazolium bromide, metal fine particles 107 are Au particles having an average particle diameter of 5 nm, and a modified organic molecule 112 is 1-(12-mercaptododecyl)-3-methylimidazolium bromide. As in Example 1, the $CO_2$ reduction performance of the $CO_2$ reduction catalyst in Example 36 was evaluated by electrochemical measurement. In Example 36, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

EXAMPLE 37

A $CO_2$ reduction catalyst in Example 37 is an example in which a base material surface (surface layer 102) is Au, an organic molecular layer 106 is 1-(2-mercaptoethyl)-4-methylpyridinium bromide, metal fine particles 107 are Au particles having an average particle diameter of 5 nm, and a modified organic molecule 112 is 1-(2-mercaptoethyl)-4-methylpyridinium bromide. As in Example 1, the $CO_2$ reduction performance of the $CO_2$ reduction catalyst in Example 37 was evaluated by electrochemical measurement. In Example 37, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

EXAMPLE 38

A $CO_2$ reduction catalyst in Example 38 is an example in which a base material surface (surface layer 102) is Au, an organic molecular layer 106 is 1-(2-mercaptoethyl)-1-methylpyrrolidinium bromide, metal fine particles 107 are Au particles having an average particle diameter of 5 nm, and a modified organic molecule 112 is 1-(2-mercaptoethyl)-1-methylpyrrolidinium bromide. As in Example 1, the $CO_2$ reduction performance of the $CO_2$ reduction catalyst in Example 38 was evaluated by electrochemical measurement. In Example 38, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

EXAMPLE 39

A $CO_2$ reduction catalyst in Example 39 is an example in which a base material surface (surface layer 102) is Au, an organic molecular layer 106 is 1-(2-mercaptoethyl)-1-methylpiperidinium bromide, metal fine particles 107 are Au particles having an average particle diameter of 5 nm, and a modified organic molecule 112 is 1-(2-mercaptoethyl)-1-methylpiperidinium bromide. As in Example 1, the $CO_2$ reduction performance of the $CO_2$ reduction catalyst in Example 39 was evaluated by electrochemical measurement. In Example 39, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

[Evaluation of $CO_2$ Reduction Performances in Examples 34 to 39]

As shown in FIG. 17, in Examples 34 to 39, the organic molecular layer 106 and the modified organic molecule 112 were suitably changed without changing the surface layer 102 and the material and the average particle diameter of the metal fine particles 107. In Examples 34 to 39, the same molecule was used in the organic molecular layer 106 and the modified organic molecule 112. As the electrolytic solution for $CO_2$ reduction, the 5% aqueous sodium hydrogencarbonate solution was used. The average particle diameter of the metal fine particles 107 was relatively small and 3 nm.

In the $CO_2$ reduction catalyst in Examples 34 to 39, as compared to the flat-plate shaped Au electrode shown in Comparative Example 14, the $CO_2$ reduction potential is low, and the production selectivity (total of all product selectivities) is high. In this case, as $CO_2$ reduction products, HCOOH, HCHO, and $CH_3OH$ were produced with high selectivity in addition to CO. This is considered to be due to the following reason.

In Examples 34 to 39, since the average particle diameter of the metal fine particles 107 is as small as 3 nm, the total of the surface areas is increased. Thus, the modified organic molecules 112 contributing the enhancement of $CO_2$ reduction activity are arranged with high density. Consequently, a strong interaction between a carbonate ion and the modified organic molecule 112 is obtained. Consequently, it is considered that a reduction potential was further reduced, and the selectivity of a reduction product was changed. In other words, since a large number of the modified organic molecules 112 are formed, the $CO_2$ reduction reaction can be selectively proceeded with low energy.

The selectivity of a reduction product can be changed by changing the structure of the modified organic molecule 112.

Next, Example 40 and Comparative Example 15 will be described using FIG. 18.

EXAMPLE 40

A $CO_2$ reduction catalyst in Example 40 is an example in which a base material surface (surface layer 102) is Au, an organic molecular layer 106 is 1-(4-mercaptobutyl)-3-methylimidazolium bromide, metal fine particles 107 are Au particles having an average particle diameter of 20 nm, and a modified organic molecule 112 is 1-(4-mercaptobutyl)-3-methylimidazolium bromide. In Example 40, the $CO_2$ reduction performance was measured by applying the $CO_2$ reduction catalyst in a photochemical reaction cell and a photochemical reactor.

(Production of Photochemical Reactor)

A photochemical reaction cell was produced by the following method. The $CO_2$ reduction catalyst was produced in a similar way to Example 1, except that the organic molecular layer 106 and the modified organic molecule 112 were changed to 1-(4-mercaptobutyl)-3-methylimidazolium bromide. This $CO_2$ reduction catalyst is formed on a substrate 11 of a multi-junction solar cell.

Next, nickel oxide nanoparticles were dispersed into an alcohol aqueous solution, and an oxidation catalyst layer 19 was formed in an oxidation electrode layer 18 of the multi-junction solar cell by spray coating. A photochemical cell thus obtained was cut out into a size of 150 mm×250 mm.

(Measurement of Energy Conversion Efficiency)

The photochemical cell was incorporated into the photochemical reactor, and the $CO_2$ reduction efficiency was evaluated. A 0.5 M potassium hydroxide (KOH) aqueous solution was used in an oxidation-side electrolytic solution, and a 50% triethanolamine aqueous solution ($CO_2$ saturated aqueous solution) was used in a reduction-side electrolytic solution. An anion exchange membrane was used as an ion exchange membrane. Light at AM 1.5 (100 mW/cm²) emitted by a solar simulator was irradiated from the oxidation catalyst layer 19 side, and CO gas generated on the reduction side was quantitatively analyzed by gas chromatography. According to this constitution, an energy conversion efficiency (an efficiency obtained when an irradiated solar energy was used as a denominator, and a Gibbs free energy of a produced material was used as a numerator) was calculated.

COMPARATIVE EXAMPLE 15

A $CO_2$ reduction catalyst in Comparative Example 1 is an example in which a base material surface (surface layer 102) is Au, an organic molecular layer 106, a metal fine particle 107, and a modified organic molecule 112 are not formed. As in Example 1, the $CO_2$ reduction catalyst in Comparative Example 1 was applied to a photochemical reaction cell and a photochemical reactor, and the energy conversion efficiency was calculated.

[Evaluation of Energy Conversion Efficiency According to $CO_2$ reduction in Example 40]

When the $CO_2$ reduction catalyst in Comparative Example 15 is applied to a photochemical reactor, the energy conversion efficiency in the photochemical reactor is 0.01%.

Meanwhile, when the $CO_2$ reduction catalyst in Example 40 is applied to the photochemical reactor, the energy conversion efficiency is 0.03%, and the energy conversion efficiency higher than that in Comparative Example 15 is exhibited. In the $CO_2$ reduction catalyst in Example 40, the reaction of $CO_2$ reduction can be selectively advanced with low energy with respect to the $CO_2$ reduction reaction, and it is effective even with light energy.

Next, Examples 41 to 52 will be described using FIGS. 19 and 20.

EXAMPLE 41

As shown in FIG. 19, a $CO_2$ reduction catalyst in Example 41 is an example in which a base material surface (surface layer 102) is Au, an organic molecular layer 106 is 1-(2-mercaptoetyl)-3-methylimidazolium bromide, metal fine particles 107 are Au particles having an average particle diameter of 3 nm, and a modified organic molecule 112 is 1-(2-mercaptoetyl)-3-methylimidazolium bromide. The molecular density of the organic molecular layer 106 on the surface layer 102 in Example 41 is $1\times10^{11}$ atoms/cm².

(Method of Calculating Molecular Density)

In Example 41, in order to calculate a binding state of molecules of the organic molecular layer 106 and the molecular density, analysis using an X-ray photoemission spectroscopy (XPS) was performed. The analysis conditions are shown as follows. A detection angle shows an angle formed by a sample normal and a detector input lens shaft.

Model in use Quantera-SXM manufactured by PHI

Irradiation X-ray source single crystal spectrum AlKα ray

| | |
|---|---|
| Output | 50 W |
| Analyzed area | ϕ200 μm |
| Pass Energy | Wide Scan - 280.0 eV (1.0 eV/Step) |
| | Narrow Scan - 69.0 eV (0.125 eV/Step) |
| Detection angle | 45° |

Charge neutralization electron gun using both Ar⁺ and e⁻ As electrification correction (horizontal axis energy correction), C—C/H binding component of a C1s spectrum was made to correspond to 284.80 eV.

The binding density (molecular density) of the molecules of the organic molecular layer 106 was calculated from the number of S atoms, normalized from the number of Au atoms (S/Au) in semi-quantitative analysis results with respect to the number of Au atoms per unit area roughly estimated using the formula (12), using the formula (13).

$$\text{Au (atoms/cm}^2\text{)=density } (g/cm^3)\times\text{detection depth} \quad (nm)\times N/Mw \quad (12)$$

$$\text{Molecular density (atoms/cm}^2\text{)=Au (atoms/cm}^2\text{)}\times S/ \quad \text{Au (atomic number ratio)} \quad (13)$$

Here, the density is 19.3 g/cm³, detection depth is 5 nm, N is Avogadro's number (atoms/mol), Mw is 197 g/mol.

(Measurement of $CO_2$ Reduction Performance)

As in Example 41, in an electrochemical measuring device similar to that in Example 1, when constant potential electrolysis was conducted so that a potential electrode (voltage) of a working electrode with respect to a reference electrode was −1.3 V, an electric current flowing through the working electrode and a counter electrode was measured. Since the electric current changes immediately after start of the electrolysis, a value after 30 minutes when the potential was stabilized was adopted. In Example 41, a 5% aqueous sodium hydrogencarbonate solution ($NaHCO_3$, $CO_2$ saturated absorbing liquid) was selected as a $CO_2$ absorbent and an electrolytic solution for $CO_2$ reduction.

Further, a reduction product produced at that time was analyzed. A gas component (hydrogen gas and carbon monoxide gas) was analyzed by a gas chromatography (Varian Micro GC CP4900). Further, formic acid, formaldehyde, methanol, acetic acid, acetaldehyde, and ethanol as products dissolved in an electrolytic solution were analyzed. Formic acid was analyzed by ion chromatography (manufactured by Thermo Fisher Scientific K.K. (DX-320)), formaldehyde was analyzed by high-performance liquid chromatography (manufactured by Waters (ACQUITY UPLC))), methanol was analyzed by gas chromatograph/mass spectrometry analysis (manufactured by Agilent Technologies (6890/5975)), and acetic acid, acetaldehyde, and ethanol were analyzed by gas chromatograph/mass spectrometry analysis (manufactured by Agilent Technologies (7890/5975)). The Faraday efficiency (product selectivity) was obtained from a current consumed by reduction reaction in the working electrode and quantitative analysis of a produced reduction product.

EXAMPLE 42

A $CO_2$ reduction catalyst in Example 42 is an example in which a base material surface (surface layer 102) is Au, an organic molecular layer 106 is 1-(6-mercaptohexyl)-3-methylimidazolium bromide, metal fine particles 107 are Au particles having an average particle diameter of 3 nm, and a modified organic molecule 112 is 1-(6-mercaptohexyl)-3-methylimidazolium bromide. The molecular density of the organic molecular layer 106 on the surface layer 102 in Example 42 is $1 \times 10^{11}$ atoms/cm$^2$. The molecular density of the organic molecular layer 106 was detected from XPS analysis.

As in Example 1, the $CO_2$ reduction performance of the $CO_2$ reduction catalyst in Example 42 was evaluated by electrochemical measurement. In Example 42, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 43

A $CO_2$ reduction catalyst in Example 43 is an example in which a base material surface (surface layer 102) is Au, an organic molecular layer 106 is 1-(12-mercaptododecyl)-3-methylimidazolium bromide, metal fine particles 107 are Au particles having an average particle diameter of 3 nm, and a modified organic molecule 112 is 1-(12-mercaptododecyl)-3-methylimidazolium bromide. The molecular density of the organic molecular layer 106 on the surface layer 102 in Example 43 is $1 \times 10^{11}$ atoms/cm$^2$. As in Example 41, the molecular density of the organic molecular layer 106 was detected from XPS analysis.

As in Example 1, the $CO_2$ reduction performance of the $CO_2$ reduction catalyst in Example 43 was evaluated by electrochemical measurement. In Example 43, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 44

A $CO_2$ reduction catalyst in Example 44 is an example in which a base material surface (surface layer 102) is Au, an organic molecular layer 106 is 1-(2-mercaptoethyl)-4-methylpyridinium bromide, metal fine particles 107 are Au particles having an average particle diameter of 3 nm, and a modified organic molecule 112 is 1-(2-mercaptoethyl)-4-methylpyridinium bromide. The molecular density of the organic molecular layer 106 on the surface layer 102 in Example 44 is $1.2 \times 10^{11}$ atoms/cm$^2$. As in Example 41, the molecular density of the organic molecular layer 106 was detected from the XPS analysis.

As in Example 1, the $CO_2$ reduction performance of the $CO_2$ reduction catalyst in Example 44 was evaluated by electrochemical measurement. In Example 44, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 45

A $CO_2$ reduction catalyst in Example 45 is an example in which a base material surface (surface layer 102) is Au, an organic molecular layer 106 is 1-(2-mercaptoethyl)-4-methylpyridinium bromide, metal fine particles 107 are Au particles having an average particle diameter of 3 nm, and a modified organic molecule 112 is 1-(2-mercaptoethyl)-4-methylpyridinium bromide. The molecular density of the organic molecular layer 106 on the surface layer 102 in Example 45 is $1 \times 10^{11}$ atoms/cm$^2$. As in Example 41, the molecular density of the organic molecular layer 106 was detected from the XPS analysis.

As in Example 1, the $CO_2$ reduction performance of the $CO_2$ reduction catalyst in Example 45 was evaluated by electrochemical measurement. In Example 45, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 46

A $CO_2$ reduction catalyst in Example 46 is an example in which a base material surface (surface layer 102) is Au, an organic molecular layer 106 is 1-(2-mercaptoethyl)-4-methylpyridinium bromide, metal fine particles 107 are Au particles having an average particle diameter of 3 nm, and a modified organic molecule 112 is 1-(2-mercaptoethyl)-4-methylpyridinium bromide. The molecular density of the organic molecular layer 106 on the surface layer 102 in Example 46 is $1.3 \times 10^{11}$ atoms/cm$^2$. As in Example 41, the molecular density of the organic molecular layer 106 was detected from the XPS analysis.

As in Example 1, the $CO_2$ reduction performance of the $CO_2$ reduction catalyst in Example 46 was evaluated by electrochemical measurement. In Example 46, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 47

As shown in FIG. 20, a $CO_2$ reduction catalyst in Example 47 is an example in which a base material surface (surface layer 102) is Au, an organic molecular layer 106 is 1-(2-mercaptoethyl)-3-methylimidazolium bromide, metal fine particles 107 are Au particles having an average particle diameter of 3 nm, and a modified organic molecule 112 is 1-(2-mercaptoethyl)-3-methylimidazolium bromide. The molecular density of the organic molecular layer 106 on the surface layer 102 in Example 47 is $1 \times 10^{14}$ atoms/cm$^2$. Namely, as in Example 47, the molecular density of the organic molecular layer 106 was increased compared to Examples 41 to 46. As in Example 41, the molecular density of the organic molecular layer 106 was detected from the XPS analysis.

As in Example 1, the $CO_2$ reduction performance of the $CO_2$ reduction catalyst in Example 47 was evaluated by electrochemical measurement. In Example 47, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

(Production Method of Binding Organic Binding Molecular Layer 106 in Densest Manner)

As a method of forming an organic molecular layer 106 in a densest manner on a surface (surface layer 102) of a charge collector 101 (increasing the molecular density of the organic molecular layer 106), activation processing for promoting binding of organic molecules to the surface (surface layer 102) of the charge collector 101 is conducted. The activation processing removes an oxide film and an adsorbed organic compound on the surface layer 102 to expose a metal surface which is active for reaction with the organic molecular layer 106. More specifically, when the surface layer 102 is a noble metal such as gold or platinum, an organic compound adsorbed to the surface can be removed by immersing a substrate in a Piranha solution (sulfuric acid:30% hydrogen peroxide solution=3:1).

As other methods, a UV-ozone cleaning method and an electrochemical method may be used. The electrochemical method is preferably used because a reaction for binding molecules is easily advanced. In the electrochemical method, potential scanning according to cyclic voltammetry is repeated in a sulfuric acid aqueous solution. More specifically, in a three-electrode type cell, the charge collector 101 (surface layer 102) is used as a working electrode, a platinum electrode is used as a counter electrode, a silver-silver chloride electrode is used as a reference electrode, and a sulfuric acid aqueous solution is used as an electrolytic solution. The potential of the working electrode is set based on the reference electrode, and potential scanning is repeated. When the working electrode (surface layer 102) is a gold electrode, the potential range is from −0.1 to 1.5 V, the scanning speed is from 10 to 200 mV/second, and the scanning time is from 30 minutes to 3 hours. If a reproducible oxidation-reduction wave is obtained, it can be judged that the working electrode has been cleaned, and the processing conditions can be suitably selected.

In Example 47, the activation processing in the electrochemical method in which potential scanning according to cyclic voltammetry is repeated in a sulfuric acid aqueous solution was conducted. The potential range was from −0.1 to 1.5 V, the scanning speed was from 150 mV/second, and the scanning time was from 60 minutes.

EXAMPLE 48

A $CO_2$ reduction catalyst in Example 48 is an example in which a base material surface (surface layer 102) is Au, an organic molecular layer 106 is 1-(6-mercaptohexyl)-3-methylimidazolium bromide, metal fine particles 107 are Au particles having an average particle diameter of 3 nm, and a modified organic molecule 112 is 1-(6-mercaptohexyl)-3-methylimidazolium bromide. The molecular density of the organic molecular layer 106 on the surface layer 102 in Example 48 is $8 \times 10^{13}$ atoms/cm$^2$. As in Example 41, the molecular density of the organic molecular layer 106 was detected from the XPS analysis.

In Example 48, in order to increase the molecular density of the organic molecular layer 106, the activation processing in the electrochemical method in which potential scanning according to cyclic voltammetry is repeated in a sulfuric acid aqueous solution was conducted. The potential range was from −0.1 to 1.5 V, the scanning speed was from 150 mV/second, and the scanning time was from 40 minutes.

As in Example 1, the $CO_2$ reduction performance of the $CO_2$ reduction catalyst in Example 48 was evaluated by electrochemical measurement. In Example 48, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 49

A $CO_2$ reduction catalyst in Example 49 is an example in which a base material surface (surface layer 102) is Au, an organic molecular layer 106 is 1-(12-mercaptododecyl)-3-methylimidazolium bromide, metal fine particles 107 are Au particles having an average particle diameter of 3 nm, and a modified organic molecule 112 is 1-(12-mercaptododecyl)-3-methylimidazolium bromide. The molecular density of the organic molecular layer 106 on the surface layer 102 in Example 49 is $1.2 \times 10^{15}$ atoms/cm$^2$. As in Example 41, the molecular density of the organic molecular layer 106 was detected from the XPS analysis.

In Example 49, in order to increase the molecular density of the organic molecular layer 106, the activation processing in the electrochemical method in which potential scanning according to cyclic voltammetry is repeated in a sulfuric acid aqueous solution was conducted. The potential range was from −0.1 to 1.5 V, the scanning speed was from 150 mV/second, and the scanning time was from 90 minutes.

As in Example 1, the $CO_2$ reduction performance of the $CO_2$ reduction catalyst in Example 49 was evaluated by electrochemical measurement. In Example 49, a 5% aqueous sodium hydrogencarbonate solution (NaHCO$_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 50

A $CO_2$ reduction catalyst in Example 50 is an example in which a base material surface (surface layer 102) is Au, an organic molecular layer 106 is 1-(2-mercaptoethyl)-4-methylpyridinium bromide, metal fine particles 107 are Au particles having an average particle diameter of 3 nm, and a modified organic molecule 112 is 1-(2-mercaptoethyl)-4-methylpyridinium bromide. The molecular density of the organic molecular layer 106 on the surface layer 102 in Example 50 is $5 \times 10^{12}$ atoms/cm$^2$. As in Example 41, the molecular density of the organic molecular layer 106 was detected from the XPS analysis.

In Example 49, in order to increase the molecular density of the organic molecular layer 106, the activation processing in the electrochemical method in which potential scanning according to cyclic voltammetry is repeated in a sulfuric acid aqueous solution was conducted. The potential range was from −0.1 to 1.5 V, the scanning speed was from 150 mV/second, and the scanning time was from 30 minutes.

As in Example 1, the $CO_2$ reduction performance of the $CO_2$ reduction catalyst in Example 50 was evaluated by electrochemical measurement. In Example 50, a 5% aqueous sodium hydrogencarbonate solution ($NaHCO_3$, $CO_2$ saturated absorbing liquid) was selected as a $CO_2$ absorbent and an electrolytic solution for $CO_2$ reduction.

As in Example 41, a reduction product produced at that time was analyzed.

EXAMPLE 51

A $CO_2$ reduction catalyst in Example 51 is an example in which a base material surface (surface layer 102) is Au, an organic molecular layer 106 is 1-(2-mercaptoethyl)-1-methylpyrrolidinium bromide, metal fine particles 107 are Au particles having an average particle diameter of 3 nm, and a modified organic molecule 112 is 1-(2-mercaptoethyl)-1-methylpyrrolidinium bromide. The molecular density of the organic molecular layer 106 on the surface layer 102 in Example 51 is $1 \times 10^{14}$ atoms/cm$^2$. As in Example 41, the molecular density of the organic molecular layer 106 was detected from the XPS analysis.

In Example 49, in order to increase the molecular density of the organic molecular layer 106, the activation processing in the electrochemical method in which potential scanning according to cyclic voltammetry is repeated in a sulfuric acid aqueous solution was conducted. The potential range was from −0.1 to 1.5 V, the scanning speed was from 150 mV/second, and the scanning time was from 60 minutes.

As in Example 1, the $CO_2$ reduction performance of the $CO_2$ reduction catalyst in Example 51 was evaluated by electrochemical measurement. In Example 51, a 50% triethanolamine aqueous solution ($CO_2$ saturated aqueous solution) was selected as a $CO_2$ absorbent and an electrolytic solution for $CO_2$ reduction.

As in Example 41, a reduction product produced at that time was analyzed.

EXAMPLE 52

A $CO_2$ reduction catalyst in Example 52 is an example in which a base material surface (surface layer 102) is Au, an organic molecular layer 106 is 1-(2-mercaptoethyl)-1-methylpiperidinium bromide, metal fine particles 107 are Au particles having an average particle diameter of 3 nm, and a modified organic molecule 112 is 1-(2-mercaptoethyl)-1-methylpiperidinium bromide. The molecular density of the organic molecular layer 106 on the surface layer 102 in Example 52 is $1 \times 10^{14}$ atoms/cm$^2$. As in Example 41, the molecular density of the organic molecular layer 106 was detected from the XPS analysis.

In Example 52, in order to increase the molecular density of the organic molecular layer 106, the activation processing in the electrochemical method in which potential scanning according to cyclic voltammetry is repeated in a sulfuric acid aqueous solution was conducted. The potential range was from −0.1 to 1.5 V, the scanning speed was from 150 mV/second, and the scanning time was from 60 minutes.

As in Example 1, the $CO_2$ reduction performance of the $CO_2$ reduction catalyst in Example 51 was evaluated by electrochemical measurement. In Example 51, a 90% EMIBF4 aqueous solution ($CO_2$ saturated aqueous solution) was selected as a $CO_2$ absorbent and an electrolytic solution for $CO_2$ reduction.

As in Example 41, a reduction product produced at that time was analyzed.

[Evaluation of $CO_2$ Reduction Performances in Examples 41 to 52]

As shown in FIGS. 19 and 20, in Examples 41 to 52, the organic molecular layer 106 and the modified organic molecule 112 were suitably changed without changing the surface layer 102 and the material and the average particle diameter of the metal fine particles 107. The same molecule was used in the organic molecular layer 106 and the modified organic molecule 112. The average particle diameter of the metal fine particles 107 was relatively small at 3 nm.

In Examples 41 to 46, since the activation processing applied to the surface layer 102 was not conducted, the molecular density of the organic molecular layer 106 was approximately $1 \times 10^{11}$ atoms/cm$^2$. Thus, CO, HCOOH, HCHO, and $CH_3OH$ were mainly produced by the $CO_2$ reduction. Meanwhile, in Examples 47 to 52, since electrochemical activation processing was applied to the surface layer 102, the molecular density of the organic molecular layer 106 was $1 \times 10^{12}$ to $10^{15}$ atoms/cm$^2$. Thus, in addition to CO, HCOOH, HCHO, and $CH_3OH$, $CH_3COOH$, $CH_3CHO$, and $CH_3CH_2OH$ were produced by the $CO_2$ reduction. In particular, when the molecular density of the organic molecular layer 106 was $1 \times 10^{13}$ to $10^{15}$ atoms/cm$^2$, $CH_3COOH$, $CH_3CHO$, and $CH_3CH_2OH$ were mainly produced by the $CO_2$ reduction. In accordance with the molecular density of the organic molecular layer 106, HCOOH, HCHO, $CH_3OH$, $CH_3COOH$, $CH_3CHO$, and $CH_3CH_2OH$ were produced with high selectivity in addition to CO.

A modified molecule (organic molecular layer 106) has a function of stabilizing and holding an unstable one-electron reductant ($CO_2$ radical anion) initially produced by a $CO_2$ reduction reaction and can advance a multi-electron reduction reaction. Accordingly, in addition to CO, HCOOH, HCHO, and $CH_3OH$ can be produced by a modified molecule. Further, the higher the modified molecular density (the molecular density of the organic molecular layer 106), the shorter the distance between modified molecules. Thus, a distance between unstable one-electron reductants ($CO_2$ radical anions) in the $CO_2$ reduction reaction is short, and thus a dimerization reaction for forming a C—C combination easily occurs. Consequently, on the densest modified molecular layer, a reaction in which adjacent one-electron reductants ($CO_2$ radical anions) are bound each other preferentially occurs before processing to a reduction reaction of a second electron. Consequently, after that, a multi-electron reduction reaction occurs, whereby $CH_3COOH$, $CH_3CHO$, and $CH_3CH_2OH$ were produced with high selectivity. Namely, the selectivity of reduction products can be controlled by changing the molecular density of modified molecules.

In this example, although a product is defined by the molecular density of the organic molecular layer 106, this invention is not limited to this configuration. When the modified organic molecule 112 as shown in FIG. 4 is formed directly on the surface layer 102, a product is defined by the molecular density of the modified organic molecule 112. Namely, a product is defined by the molecular density of a modified molecule (the organic molecular layer 106 and the modified organic molecules 112) formed on the surface layer 102.

In the CO₂ reduction catalysts in Examples 41 to 52, as compared to the flat-plate shaped Au electrode shown in Comparative Example 14, the $CO_2$ reduction potential is low, and the production selectivity (total of all product selectivities) is high. The total of the selectivities of $CO_2$ reduction does not reach 100% because a side reaction due to hydrogen generation occurs.

Even if an amine aqueous solution, an ionic liquid aqueous solution, or sodium hydrogen carbonate is used as an electrolytic solution for $CO_2$ reduction as in Examples 41 to 52, a $CO_2$ reduction catalyst having high $CO_2$ reduction performance can be provided. In particular, when the ionic liquid aqueous solution was used (Example 52), the $CO_2$ reduction catalyst according to the present embodiment exhibited the highest $CO_2$ reduction performance.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A reduction catalyst comprising:
   a charge collector having a metal layer on a surface thereof; and
   an organic molecule comprising a reactive functional group and a quaternary nitrogen cation and bound to a surface of the metal layer by the reactive functional group.

2. The reduction catalyst of claim 1, wherein the quaternary nitrogen cation comprises one of alkylammonium cation, pyridinium cation, piperidinium cation, and imidazolium cation.

3. The reduction catalyst of claim 1, wherein the metal layer comprises metal fine particles.

4. The reduction catalyst of claim 3, wherein the metal fine particle comprises one of gold, silver, platinum, copper, and zinc.

5. The reduction catalyst of claim 3, wherein an average particle diameter of the metal fine particles is not less than 0.5 nm and not more than 300 nm.

6. The reduction catalyst of claim 3, wherein an average particle diameter of the metal fine particles is not less than 1.0 nm and not more than 150 nm.

7. The reduction catalyst of claim 1, wherein in the metal layer to which the organic molecule is bound, at least one of carbon dioxide, formic acid, and formaldehyde is reduced.

8. The reduction catalyst of claim 7, wherein in the metal layer to which the organic molecule is bound, methanol is produced.

9. The reduction catalyst of claim 1, wherein a molecular density of the organic molecule is not less than $1 \times 10^{13}$ atmos/cm².

10. The reduction catalyst of claim 1, wherein a molecular density of the organic molecule is not more than $1 \times 10^{11}$ atmos/cm².

11. A chemical reactor comprising:
    an oxidation catalyst layer which oxidizes water;
    a first reduction catalyst layer which comprises a charge collector comprising a metal layer formed on a surface thereof and an organic molecule, the organic molecule comprising a reactive functional group and a quaternary nitrogen cation and bound to a surface of the metal layer by the reactional functional group; and
    a power supply element connected to the oxidation catalyst layer and the first reduction catalyst layer.

12. The chemical reactor of claim 11, wherein the power supply element comprises a semiconductor layer that separates charges with light energy.

13. The chemical reactor of claim 12, wherein the semiconductor layer is formed between the oxidation catalyst layer and the first reduction catalyst layer.

14. The chemical reactor of claim 11, wherein the quaternary nitrogen cation comprises one of alkylammonium cation, pyridinium cation, piperidinium cation, and imidazolium cation.

15. The chemical reactor of claim 11, wherein the metal layer comprises metal fine particles.

16. The chemical reactor of claim 11, wherein the first reduction catalyst layer is immersed in a solution absorbed with at least one of carbon dioxide, formic acid, and formaldehyde, and in the metal layer to which the organic molecule is bound, at least one of carbon dioxide, formic acid, and formaldehyde is reduced.

17. The chemical reactor of claim 16, wherein at least one of formic acid and formaldehyde reduced in the metal layer to which the organic molecule is bound is produced by an electrolytic apparatus comprising a second reduction catalyst layer in which at least one of carbon dioxide and formic acid is reduced.

18. The photochemical reactor of claim 17, wherein the second reduction catalyst layer comprises at least one of a metal catalyst, an organic metal complex catalyst, and a boron-doped diamond catalyst.

19. The chemical reactor of claim 11, wherein the first reduction catalyst layer is immersed in a solution absorbed with carbon dioxide, a molecular density of the organic molecule is not less than $1 \times 10^{13}$ atmos/cm², and in the metal layer to which the organic molecule is bound, carbon dioxide is reduced to produce acetic acid, acetaldehyde, and ethanol.

20. The chemical reactor of claim 11, wherein the first reduction catalyst layer is immersed in a solution absorbed with carbon dioxide, a molecular density of the organic molecule is not more than $1 \times 10^{11}$ atmos/cm², and in the metal layer to which the organic molecule is bound, carbon dioxide is reduced to produce formic acid, formaldehyde, and methanol.

* * * * *